(12) United States Patent
Teensma et al.

(10) Patent No.: US 7,628,597 B2
(45) Date of Patent: Dec. 8, 2009

(54) LABELED CONTAINERS, METHODS AND DEVICES FOR MAKING SAME

(75) Inventors: Wijnand J. Teensma, Sneek (NL); Michael T. Williams, Beaver Falls, PA (US); Dennis H. Piispanen, Beaver, PA (US); Tricia Guevara, Koppel, PA (US); Jiansheng Tang, Mars, PA (US)

(73) Assignee: NOVA Chemicals Inc., Moon Township, PA (US)

( * ) Notice: Subject to any disclaimer, the term of this patent is extended or adjusted under 35 U.S.C. 154(b) by 573 days.

(21) Appl. No.: 11/506,818

(22) Filed: Aug. 18, 2006

(65) Prior Publication Data

US 2007/0042144 A1  Feb. 22, 2007

Related U.S. Application Data

(60) Provisional application No. 60/710,135, filed on Aug. 22, 2005, provisional application No. 60/725,517, filed on Oct. 11, 2005.

(51) Int. Cl.
*B29C 44/12* (2006.01)
(52) U.S. Cl. .............. 425/4 R; 425/126.1; 425/174.8 E
(58) Field of Classification Search .............. 425/126.1, 425/174.8 E, 4 R
See application file for complete search history.

(56) References Cited

U.S. PATENT DOCUMENTS

| 2,898,632 | A | * | 8/1959 | Basil Irwin Harry et al. .. 264/48 |
|---|---|---|---|---|
| 2,983,692 | A | | 5/1961 | D'Alelio |
| 3,023,175 | A | | 2/1962 | H. Rodman, Jr. |
| 3,324,508 | A | * | 6/1967 | Dickinson Barry L ... 425/126.1 |
| 3,602,496 | A | * | 8/1971 | Langenohl et al. ............ 271/14 |
| 3,899,277 | A | * | 8/1975 | Winter ....................... 425/383 |
| 3,959,189 | A | | 5/1976 | Kitamori |
| 4,106,397 | A | | 8/1978 | Amberg et al. |
| 4,168,353 | A | | 9/1979 | Kitamori |
| 4,236,954 | A | * | 12/1980 | Edwards ..................... 156/352 |
| 4,303,756 | A | | 12/1981 | Kajimura et al. |
| 4,303,757 | A | | 12/1981 | Kajimura et al. |
| 4,534,927 | A | | 8/1985 | Morioka et al. |
| 4,822,274 | A | * | 4/1989 | Chan et al. ............... 425/450.1 |
| 5,053,101 | A | * | 10/1991 | Dromigny .................. 156/571 |
| 5,244,861 | A | | 9/1993 | Campbell et al. |

(Continued)

FOREIGN PATENT DOCUMENTS

JP  56113433 A  *  9/1981

(Continued)

*Primary Examiner*—Robert B Davis
(74) *Attorney, Agent, or Firm*—Gary F. Matz

(57) ABSTRACT

A device and method for producing labeled expanded resin containers; the method including applying a label sheet, formed from a label material capable of maintaining an electrostatic charge, to an inner wall of female portions of two-part molds, positioning one or more male portions of the two-part molds in contact with the corresponding female portions to form one or more mold cavities; adding expandable resin beads or pre-expanded resin beads to the mold cavities; applying a sufficient amount of heat for a sufficient length of time to the mold cavities to effect expansion of the expandable resin beads or pre-expanded resin beads to form labeled containers; cooling the labeled containers; and removing the labeled containers from the mold cavities. The labels on the external wall of the labeled containers present a smooth circumferential surface.

11 Claims, 17 Drawing Sheets

U.S. PATENT DOCUMENTS

| | | | |
|---|---|---|---|
| 5,520,876 A * | 5/1996 | Dobler | 264/511 |
| 5,614,146 A * | 3/1997 | Nakamura et al. | 264/511 |
| 5,808,681 A | 9/1998 | Kitajima | |
| 5,853,965 A | 12/1998 | Haydock et al. | |
| 5,866,282 A | 2/1999 | Bourdelais et al. | |
| 5,874,205 A | 2/1999 | Bourdelais et al. | |
| 5,888,643 A | 3/1999 | Aylward et al. | |
| 5,888,683 A | 3/1999 | Gula et al. | |
| 5,888,714 A | 3/1999 | Bourdelais et al. | |
| 5,908,590 A * | 6/1999 | Yoshimi et al. | 264/45.4 |
| 6,007,759 A | 12/1999 | Ten Tije et al. | |
| 6,066,594 A | 5/2000 | Gunn et al. | |
| 6,127,439 A | 10/2000 | Berghmans et al. | |
| 6,160,027 A | 12/2000 | Crevecoeur et al. | |
| 6,242,540 B1 | 6/2001 | Crevecoeur et al. | |
| 6,790,400 B1 * | 9/2004 | Muller et al. | 264/267 |
| 6,908,949 B2 | 6/2005 | Arch et al. | |
| 2002/0153091 A1 | 10/2002 | Preston et al. | |
| 2003/0146533 A1 | 8/2003 | Gornell | |
| 2004/0121101 A1 | 6/2004 | Tang et al. | |
| 2006/0005917 A1 | 1/2006 | Alvarez | |

FOREIGN PATENT DOCUMENTS

| | | |
|---|---|---|
| JP | 11-17 9 810 A | 7/1999 |
| WO | WO 01/85420 A1 | 11/2001 |

* cited by examiner

LABELED CONTAINERS, METHODS AND DEVICES FOR MAKING SAME

REFERENCE TO RELATED APPLICATION

This application claims the benefit of priority of U.S. Provisional Application Ser. Nos. 60/710,135 filed Aug. 22, 2005 entitled "Labeled Containers, Methods and Devices for Making Same" and 60/725,517 filed Oct. 11, 2005 entitled "Labeled Containers, Methods and Devices for Making Same," which are both herein incorporated by reference in their entirety.

BACKGROUND OF THE INVENTION

1. Field of the Invention

The present invention relates to a disposable container, methods of making the disposable container and machines and devices that can be used in the method and/or to make the disposable container. More particularly, the present invention relates to a container made of expandable thermoplastic resin beads with a label sheet disposed about the outer surfaces of the sidewall of the container. The container can be used for holding hot or cold liquids, such as beverages, or foods such as instant noodles, soups, fried chicken, and the like.

2. Background Art

The manufacture of molded articles, such as containers, for example cups, bowls, and the like from expanded thermoplastic particles is well known. The most commonly used thermoplastic particles are expandable polystyrene particles known as EPS. Typically, polystyrene beads are impregnated with a blowing agent, which boils below the softening point of the polystyrene and causes the impregnated beads to expand when they are heated.

The formation of molded articles from impregnated polystyrene beads is generally done in two steps. First, the impregnated polystyrene beads are pre-expanded to a density of from about 0.5 to 12 pounds per cubic foot or 5 to 150 grams per liter. Second, the pre-expanded beads are heated in a closed mold to further expand the pre-expanded beads to form a fused article having the shape of the mold.

The expandable polystyrene particles used to make foam containers are generally prepared by an aqueous suspension polymerization process, which results in beads that can be screened to relatively precise bead sizes. Typically, bead diameters are within the range of from about 0.008 to about 0.02 inch (about 0.2 to about 0.5 mm). Occasionally, cups are made from particles having bead diameters as high as 0.03 inches.

It is desirable to provide containers with thin walls that provide adequate insulating and structural properties and that contain high quality printed graphics on the outside surfaces of the container.

One method of obtaining printed graphics on the outside surfaces of a container is by molding the container and then printing on the outside surface of the container. However, this approach typically results in lower print quality and does not convey the desired commercial image.

Another method that has been employed is to pre-print labels that are applied to the outside surfaces of a container after molding. As an example, U.S. Patent Application Publication No. 2006/005917 A1 discloses a method and apparatus for producing labeled, plastic foam containers, such as labeled EPS cups that includes using a heated secondary mold to thermally bond a label to a plastic cup. Although high quality graphics can be applied to containers using these methods, labeling consistency, due to the many mechanical steps involved is a problem. Also, the seam formed where the ends of the label meet often leaves a gap between the ends of the label sheet, where the container surface can be seen, the label can be poorly aligned vertically overlapping the container rim or base, and/or the label ends overlap forming a raised seam that can be aesthetically unattractive, can lead to inefficient cup stacking, as well as providing a site where labels can be peeled from the container surface.

Attempts to solve the above described problems have been attempted through in-mold labeling techniques. As an example, WO 01/85420 discloses a method and apparatus for molding an expanded plastic container having a label material affixed to an external wall of the container during the molding cycle. In this method, a label to be affixed to a molded container is transferred by a plunger having a vacuum pick-up head from a stack of flat labels to a dummy male core and is wrapped about the dummy core. The latter is mounted on a carriage, which is reciprocal between the label pick-up station and a vertically oriented molding station having a molding tool for molding expanded plastic material. When the dummy core enters the female mold part, the label carried by the core is transferred to and retained on the wall of the female mold part. Particular problems with this method include inconsistent label placement and molding consistency as the many mechanical steps and vertical orientation cause shifting of the machine parts and label. These problems result in a large amount of waste, i.e., containers that are molded and/or labeled improperly and cannot be used.

Additionally, in some instances, improper label placement can result in containers that leak.

There is an unmet need in the art for methods and equipment to produce smooth surfaced consistently labeled containers that can be manufactured with low waste at commercial scale and overcome the above-described problems.

SUMMARY OF THE INVENTION

The present invention is directed to a device for producing labeled expanded resin containers. The device includes
- at least one mold cavity rail;
- at least one mandrel rail oriented perpendicular to the mold cavity rail;
- a female mold cavity car adapted to move along at least one mold cavity rail between a removed position, a transfer position, and a molding position and including at least one female portion of a two-part mold oriented parallel to the mold cavity rail;
- a male mold cavity car adapted to move along at least one mold cavity rail between an extended position, a releasing position and a molding position and including at least one male portion of the two-part mold, wherein the female portion and male portion form a mold cavity when the female and male mold cavity cars are in their respective molding positions; and
- a mandrel car adapted to move along at least one mandrel rail between a readying position and an insertion position and including at least one mandrel adapted to seat within the female portion when the mandrel car is in the insertion position and the female car is in the transfer position, the mandrel car including one or more cup removers adapted to pull a vacuum and be oriented directly opposed to a male portion when the mandrel car is in the insertion position and the male cavity car is in the releasing position.

The present invention also provides a mandrel that can be used in the above-described device and includes:
- a first base having a dimension D1;

a second base having a dimension D2, where D2 is greater than D1;

a mandrel surface circumferentially and longitudinally disposed about the first base and the second base;

a plurality of charging pins positioned in depressions along the mandrel surface from the first base to the second base;

a plurality of suction holes positioned along the mandrel surface;

where at least the surface of the mandrel comprises a non-conducting material that is not deformable or hygroscopic at ambient conditions.

The present invention further provides a method of molding a labeled expanded resin container using the above-described device that includes:

applying a label sheet to an inner wall of each of one or more female portions of the two-part mold by
positioning one or more mandrels, that hold a label sheet using vacuum applied through the suction holes, in one or more female portions; and
releasing the label sheet in the female portion by stopping the vacuum and applying an electrostatic charge to the label sheet via the charging pins in the mandrel;
positioning one or more male portions of the two-part mold in contact with the corresponding female portions to form one or more mold cavities;
adding expandable resin beads or pre-expanded resin beads to the mold cavities;
applying a sufficient amount of heat for a sufficient length of time to the mold cavities to effect expansion of the expandable resin beads or pre-expanded resin beads to form labeled containers;
cooling the labeled containers; and
removing the labeled containers from the mold cavities.

The present invention additionally provides labeled expanded resin containers that include:

expandable resin beads or pre-expanded resin beads molded in a shape having a sidewall with an outer surface and a base; and a label formed from a label material capable of maintaining an electrostatic charge disposed over at least a portion of the outer surface of the sidewall of the container.

DETAILED DESCRIPTION OF THE INVENTION

Figure 1A:
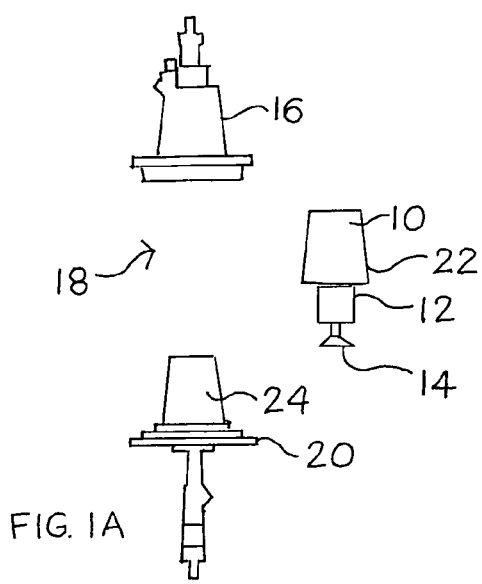
FIGS. 1A-1F are top plan views showing the relationship between female and male portions of a two-part mold, mandrel with remover, label sheet, and labeled container in the steps according to a method in the present invention.

Other than in the operating examples or where otherwise indicated, all numbers or expressions referring to quantities of ingredients, reaction conditions, etc. used in the specification and claims are to be understood as modified in all instances by the term "about." Accordingly, unless indicated to the contrary, the numerical parameters set forth in the following specification and attached claims are approximations that can vary depending upon the desired properties, which the present invention desires to obtain. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

In order to form a more complete understanding of the invention the following description should be taken in connection with the accompanying drawing figures where like reference characters identify like parts throughout.

For purposes of the description hereinafter, the terms "upper", "lower", "right", "left", "vertical", "horizontal", "top", "bottom", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

As used herein, the term "partial conical shape" refers to a shape having a first planer base that is smaller than a second planar base with a surface that tapers from the second planar base to the first planar base.

As used herein, the term "mandrel" refers to a device that has a shape similar to the male portion of a two-part mold, which can be a partial conical shape, to which a label can be fixed for transfer to the female portion of a two-part mold.

As used herein, the term "non-conducting material" refers to a material that does not readily transmit electricity by conduction.

As used herein, the term "not deformable" means a material or article that does not change its shape when reasonable stress is applied thereto at ambient or processing conditions.

As used herein, the term "not hygroscopic" refers to a property of a material in that the material does not readily absorb, adsorb, or otherwise collect or accumulate moisture at ambient conditions or under the operating conditions of the equipment described herein.

As used herein, the term "surface resistivity" refers to the resistance to the flow of electrical current over the surface of a material as can be determined, as a non-limiting example, by ASTM D257, where the resistance to an electrical current is measured by electrodes on the same surface of a material, typically reported as Ohms/sq. Surface resistivity describes the ratio of DC voltage drop per unit length to the surface current per unit width. Suitable instruments for measuring surface resistivity include, but are not limited to the Model ST-3 Work Surface Tester available from SIMCO Japan, Inc., Kobe, Japan and Model 19670 Surface Resistivity Meter available from Charles Water Co., Canton, Mass.

As used herein the term "rail" refers to a bar, rod, track, or other surface along which a wheel, collar, sleeve, or other device can move along to move a car from one position to another.

As used herein the term "car" refers to a housing, cabinet, or other structure to which the cavity parts described below are attached to or which contains cavity parts and includes one or more wheels, collars, sleeves, or other devices to enable the car to move along a rail from one position to another.

As used herein, the terms "(meth)acrylic" and "(meth)acrylate" are meant to include both acrylic and methacrylic acid derivatives, such as the corresponding alkyl esters often referred to as acrylates and (meth)acrylates, which the term "(meth)acrylate" is meant to encompass.

As used herein, the term "polymer" is meant to encompass, without limitation, homopolymers, copolymers, graft copolymers, and blends and combinations thereof.

Unless otherwise specified, all molecular weight values are determined using gel permeation chromatography (GPC) using appropriate polystyrene standards. Unless otherwise indicated, the molecular weight values indicated herein are weight average molecular weights (Mw).

As used herein, the term "expandable resin beads" refers to a polymeric material in particulate or bead form that is impregnated with a blowing agent such that when the particulates and/or beads are placed in a mold or expansion device and heat is applied thereto, evaporation of the blowing agent (as described below) effects the formation of a cellular structure and/or an expanding cellular structure in the particulates and/or beads. When expanded in a mold, the outer surfaces of the particulates and/or beads fuse together to form a continuous mass of polymeric material conforming to the shape of the mold.

As used herein, the term "pre-expanded resin beads" refers to an expandable resin beads that have been expanded, but not to their maximum expansion factor and whose outer surfaces have not fused. As used herein, the term "expansion factor" refers to the volume a given weight of resin bead occupies, typically expressed as cc/g. Pre-expanded resin beads can be further expanded in a mold where the outer surfaces of the pre-expanded resin beads fuse together to form a continuous mass of polymeric material conforming to the shape of the mold.

The present invention includes the opening and closing of valves and gates, the movement of cars along rails to specified positions, and the coordination and timing of various steps in the inventive methods and devices. In all instances, the various steps, controls and placements can be done manually, but will often be accomplished through the use of preprogrammed microprocessors and/or computers interfacing with appropriate sensors, actuators, relays, feedback loops, motors, pneumatic devices, servos, resolvers and the like as are known in the art.

The present invention provides for the molding of an expanded plastic container, which can be a thin wall product, formed from expanded plastic materials. The invention also provides containers that are labeled consistently and have a smooth surface finish, and full cover printing to a level and quality not possible with prior expanded plastic containers.

As used herein, "labeled consistently" means that the number of labeled containers produced by the methods and devices disclosed herein will meet commercial requirements. The absolute number will depend on particular commercial requirements and can be less than 5%, in some cases less than 4%, in other cases less than 3%, in some instances less than 2% and in other instances less than 1% waste due to mislabeled containers, i.e., containers where the label has an unintentional gap between its ends or the label overlaps the base or rim of the container.

As noted, the present invention enables the reproducible production of a labeled container in which a printed label sheet is adhered to the external surface of the container during the molding process. In an embodiment of the invention, the label sheet can have a heat activated adhesive layer on the side in contact with the container and is positioned in the mold cavity directly against the wall of the female portion defining the external wall of the container, whereby the label sheet is laminated with the expanded plastic material and with the external wall of the container during the molding process.

Of particular note, the labeled container provided by the invention presents a smooth circumferential surface. By "smooth circumferential surface" is meant that the label on the outer wall of the labeled container has a nearly imperceptible seam where the two ends of the label come together and/or overlap. In prior art methods, such as after mold labeling, the two ends of the label often come together to form a raised seam. In other situations, attempts are made to perfectly match the edges of the label, but often raised seams or gaps between the edges result. The present invention overcomes these problems as any overlap of the label edges is embedded within the wall of the container and is less perceptible from the exterior. Thus, although a seam line may, in some instance, be perceptible as an edge of a label sheet with containers made according to the invention, the container wall surface across the seam line is smooth to the touch. In an embodiment of the invention, if the seam line has any perceptible depth when viewed from the outside wall of the labeled container, the seam line depth is at least 1 µm, in some cases at least 0.5 µm, in other cases at least 0.25 µm, in some instances at least 0.1 µm, and in other instances at least 0.05 µm, and is not greater than 2 µm. In this embodiment, if a seam line exists, the seam line depth can be any value or vary between any of the values recited above.

According to the invention, an expanded plastic container is advantageously molded with the mouth of the container directed in a horizontal orientation so as to minimize or eliminate the force of gravity from causing the label sheet to shift between placement and molding, resulting in a mislabeled container (one form of waste). Steam for cooking the raw plastic material is introduced or injected into the male and/or female portions of the mold cavities, which can be alternately flushed with steam to heat the mold during preheating and cooking and with cooling liquid during cooling, which can be provided adjacent the inside and outside of the mold cavity. Also, a portion of the steam can be redirected and utilized to flush the cavities themselves during cooking.

An embodiment of the invention, a method of making a labeled expanded resin container, is outlined in FIGS. 1A-1F. The method includes applying a label sheet 10 to an inner wall of a female portion 16 of a two-part mold 18. The label sheets can be extracted from a magazine containing label sheets (not shown) by way of a suction plate (not shown), which holds label sheet 10 through the application of vacuum. The suction plate positions the label sheet 10 directly above a mandrel 12 and label fingers (not shown) wrap label sheet 10 in position on mandrel 12 to provide a mandrel holding a label 22.

Figure 1B:
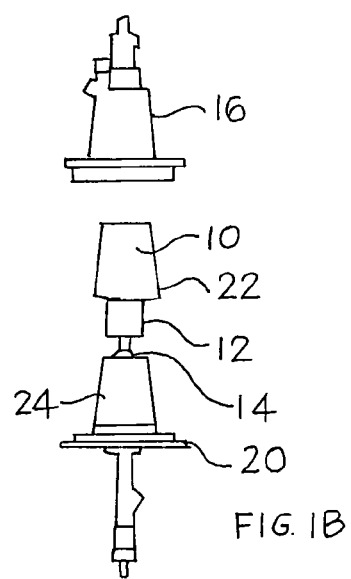
Figure 1C:
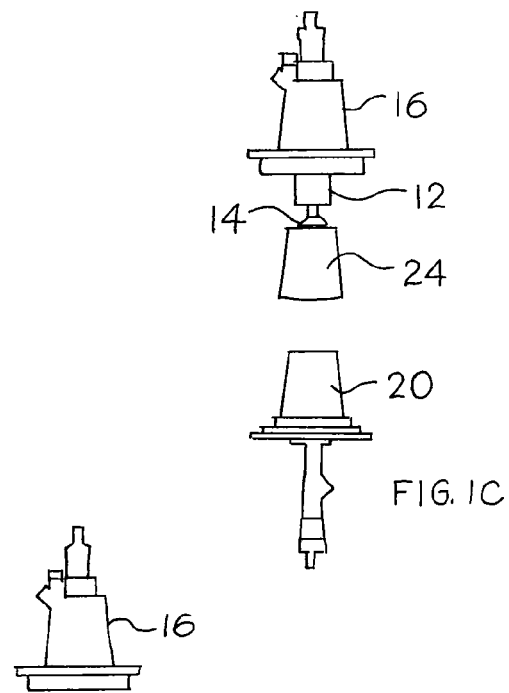

In an embodiment of the invention, as shown in FIG. 1A, when the method is operating continuously, male portions 20 of two-part mold 18 will have a labeled container 24 attached thereto. Vacuum applied through remover 14 draws labeled container 24 from male portion 20 and is held by its base via vacuum in contact with remover 14 (FIG. 1B). Male portion 20 is then withdrawn and mandrel 12 with label sheet 10 is positioned in female portion 16 (FIG. 1C). Label sheet 10 is held in place by way of vacuum applied through one or more mandrels 12 and label sheet 10 is released and positioned in the female portion 16 by stopping the vacuum and applying an electrostatic charge to the label sheet 10 via charging pins in the mandrel 12 and optionally applying a "puff" of compressed air from mandrels 12. In an embodiment of the invention, the mandrel 12 is free floating when positioned in the female portion 16. The free floating nature of mandrel 12 when inserted in female portion 16 allows for the desired mandrel-mold alignment and overcomes problems in the prior art, where inconsistent mandrel-mold alignment results in an undesirably high number of mislabeled containers (waste).

In another embodiment of the invention, the gap or space between the label sheet on mandrel 12 and the inner wall of female portion 16 when mandrel 12 is inserted in female portion 16 is small. In this embodiment, the gap can be at least 0.01, in some cases at least 0.05 and in other cases at least 0.1 mm and can be up to 5, in some cases up to 3, in other cases up to 2, and in some instances up to 1 mm. A smaller gap between mandrel 12 and the inner wall of female portion 16 provides for more precise placement of the label sheet in female portion 16. The gap or space between the label sheet on mandrel 12 and the inner wall of female portion 16 can be any value or range between any of the values recited above.

Figure 1D:
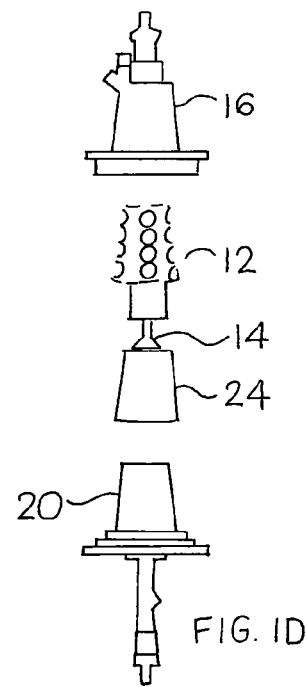
Figure 1E:
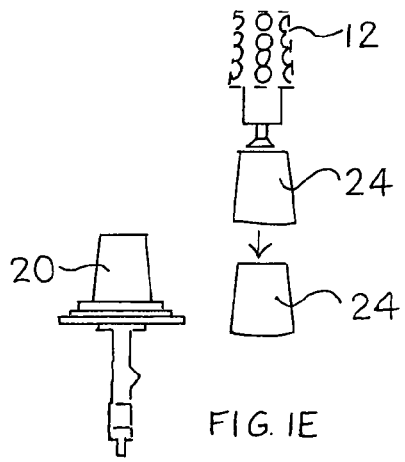

As shown in FIG. 1D, female portion 16, with label sheet 10 positioned therein is withdrawn from mandrel 16 (FIG. 1D) and mandrel 16 is withdrawn from a position horizontally opposed from female portion 16 to a position away from female portion 16 and the vacuum is released from remover 14 and labeled container 24 falls away (FIG. 1E).

In an embodiment of the invention, female portions 16 and male portions 20 of two-part mold 18 are adapted such that when the female portions 16 are in the removed position the male portions 20 and female portions 16 are spaced apart and not in contact with each other and such that when the male portions 20 are in the releasing position or extended position, the male portions are spaced apart and not in contact with the female portions 16.

Figure 1F:
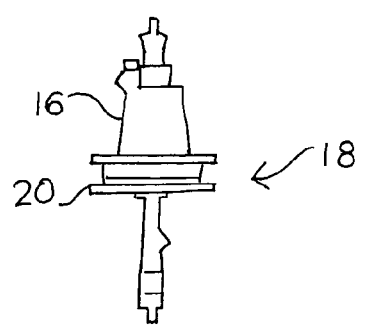

Subsequently, male portion 20 of the two-part mold 18 and female portion 16 are brought in contact to form a mold cavity (FIG. 1F). Expandable resin beads or pre-expanded resin beads are then added to the mold cavity and a sufficient amount of heat is applied for a sufficient length of time to the mold cavity to effect expansion of the expandable resin beads or pre-expanded resin beads to form labeled containers 24. The heat applied can be by way of electric, gas, or other external heating units, or, as is often the case, applied by steam as described below. The labeled containers are then cooled, male portion 20 is separated from female portion 16 and the labeled containers 24 travel with male portion 20 and are ready for removal by remover 14 (FIG. 1A).

As can readily be envisioned by those skilled in the art, devices used to carry out the above-described method can be equipped with a plurality of two-part mold cavities 18 and a corresponding number of mandrels 12. The horizontal alignment of the two-part mold cavities and mandrel allow for more precise positioning of the label sheet 10 in female portion 16, resulting in less waste due to mislabeled containers, a significant advantage over the prior art.

The label sheet 10 is an important aspect of the invention, as it must be capable of maintaining an electrostatic charge in order to effect transfer and electrostatic adhesion to the inner wall of female portion 16. As such, label sheet 10 includes
- an electrically insulating substrate having a first surface and a second surface;
- optionally a heat sensitive adhesive disposed over at least a portion of the first surface, and
- optionally a coating and/or printing ink disposed over at least a portion of a surface of the label sheet.

In an embodiment of the invention, the label sheet can be made from flexible sheet material, optionally printed on its outside or inside surface with advertising or other matter. It is of such dimensions and configuration as to be foldable about itself into a partial conical shape matching the side wall of the container and to extend about the circumference of the container for the full height of the side wall of the container.

The label sheet, substrate or material is capable of maintaining a surface electrostatic charge. As such, the surface resistivity of the label sheet, substrate or material is greater than $10^{10}$ Ω/sq, in some cases greater than $10^{11}$ Ω/sq, in other cases greater than $10^{12}$ Ω/sq, in some instances greater than $10^{13}$ Ω/sq, and in other instances greater than $10^{14}$ Ω/sq. The greater the surface resistivity of the label sheet, substrate or material, the stronger and longer the electrostatic attraction between the label sheet and inner wall of female portion 16 will be.

In an embodiment of the invention, the substrate of label sheet 10 includes one or more materials selected from one or more thermoplastic resins, cellulose based paper, and synthetic paper.

Any suitable thermoplastic resin can be used. Suitable thermoplastic resins include, but are not limited to one or more selected from polyolefinic resins, ethylene-acrylic acid copolymers, ethylene-$C_1$-$C_{12}$ alkyl (meth)acrylate ester copolymers, metal salts of ethylene-methacrylic acid copolymers, poly(4-methyl-1-pentene), polyethylene terephthalate resins, polyvinyl chloride resins, polyamide resins, ABS resins, and combinations thereof.

Any suitable polyolefinic resin can be used. Suitable polyolefinic resins include, but are not limited to propylene resins, high-density polyethylene, medium-density polyethylene, linear low-density polyethylene, ethylene-cyclic olefin copolymers, copolymers of propylene and one or more α-olefins, and combinations thereof.

Suitable synthetic papers that can be used in the invention include, without limitation, resin-coated paper, polyesters, microporous materials such as polyethylene polymer-containing material sold by PPG Industries, Inc., Pittsburgh, Pa. under the trade name of TESLIN®, a non-limiting example of which are those disclosed in U.S. Pat. No. 6,066,594, the relevant portions of which are incorporated herein by reference, TYVEK® synthetic paper available from E.I. DuPont de Nemours and Company, Wilmington, Del., OPPALYTE® films available from Mobil Oil Corp., New York, N.Y., other composite films listed in U.S. Pat. No. 5,244,861, the relevant portions of which are incorporated herein by reference, melt-extrusion-coated paper, and biaxially oriented support laminates, such as those described in U.S. Pat. Nos. 5,853,965; 5,866,282; 5,874,205; 5,888,643; 5,888,681; 5,888,683; and 5,888,714, the relevant portions of which are incorporated herein by reference.

In an embodiment of the invention, the substrate has a melting point of at least 120° C., in some cases greater than 130° C., in other cases greater than 135° C. and in some instances greater than 140° C. The melting point of the substrate is advantageously greater than the processing temperatures during molding.

The thickness of the substrate can vary based on factors such as the type of label material, the amount of structural support desired from the label sheet, and the quality of the graphics to be printed on the label sheet. As such the substrate can be at least 10 μm, in some cases at least 25 μm and in other cases at least 50 μm thick and can be up to 1,500 μm, in some cases up to 1,250 μm, in other cases up to 1,000 μm, in some instances up to 750 μm and in other instances up to 500 μm thick. The thickness of the substrate can be any value or range between any of the values recited above.

Any suitable heat sensitive adhesive can be used in the invention. Suitable heat sensitive adhesives include, but are not limited to ethylene-vinyl acetate copolymers, polyolefin resins, polyester resins, polyester-amide resins, polyamide resins, thermoplastic elastomers, acrylic resins, cellulosic resins, print lacquers and combinations thereof.

In an embodiment of the invention, a first end of a label overlaps with a second end of a label to create a seam line as described above. In this embodiment, a heat sensitive adhesive is only applied to at least a portion of a bottom surface of only the overlap portion of the first end such that the heat sensitive adhesive contacts at least a portion of a top surface of the overlap portion of the second end.

The label sheets used in the present invention are typically used to provide high quality graphics to the outside surface of the container. As such, the label sheets can include a coating and/or printing ink on a surface of the label. If the label is printed or coated on a surface in contact with the inner wall of female portion 16, the components of the coating or printing ink advantageously have a melting and/or softening point of at least 120° C., in some cases greater than 130° C., in other cases greater than 135° C. and in some instances greater than 140° C. When the melting and/or softening point of the components of the coating or printing ink are greater than the processing temperatures during molding, sticking of the labeled container to the inner wall of the female portion can be avoided.

When the label sheet is printed or coated on a side that is not in contact with the inner wall of female portion 16, any suitable printing ink or coating can be used. Typically, the substrate is clear and the printing or coating can be seen through the substrate. In an embodiment of the invention, when printing or coatings are placed on a side that is not in contact with the inner wall of female portion 16, the printing or coating is a mirror image so that the desired image is viewed through the label sheet on the labeled container.

In an embodiment of the invention, the label sheet and any ink, adhesive or other coating on the label sheet are suitable for direct and/or indirect food contact and comply with one or more of Section 201 of the U.S. Federal Food, Drug and Cosmetic Act, U.S. 21 Code of Federal Regulations (2005), EU Plastics Directive, 2002/72/EC, CoE Resolution on paper and board, Resolution AP (2002)1, or EC Superdirective on Food Contact Materials.

Figure 2:
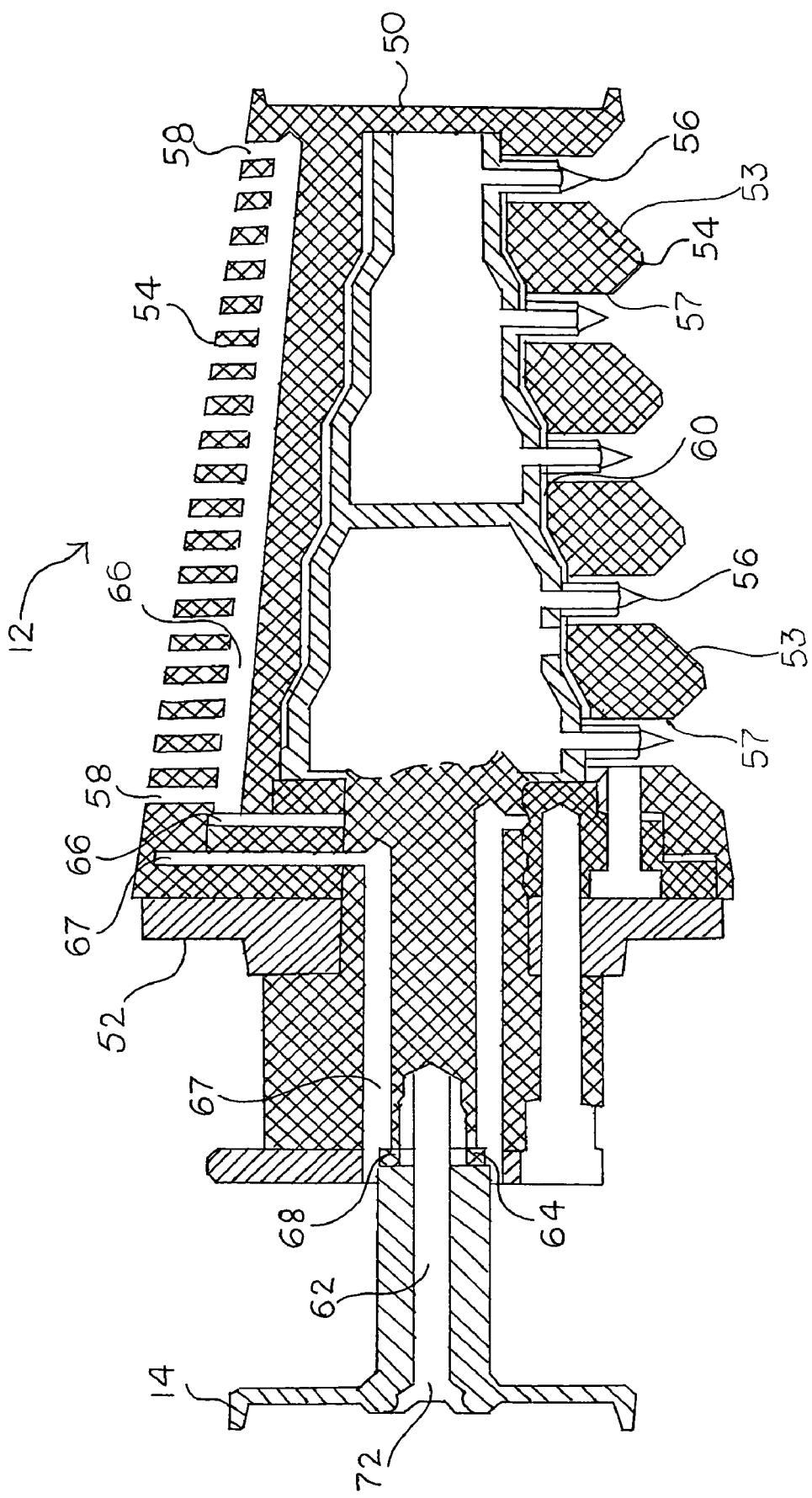
FIG. 2 is an axial section illustrating a mandrel with remover according to the invention.
Figure 3:
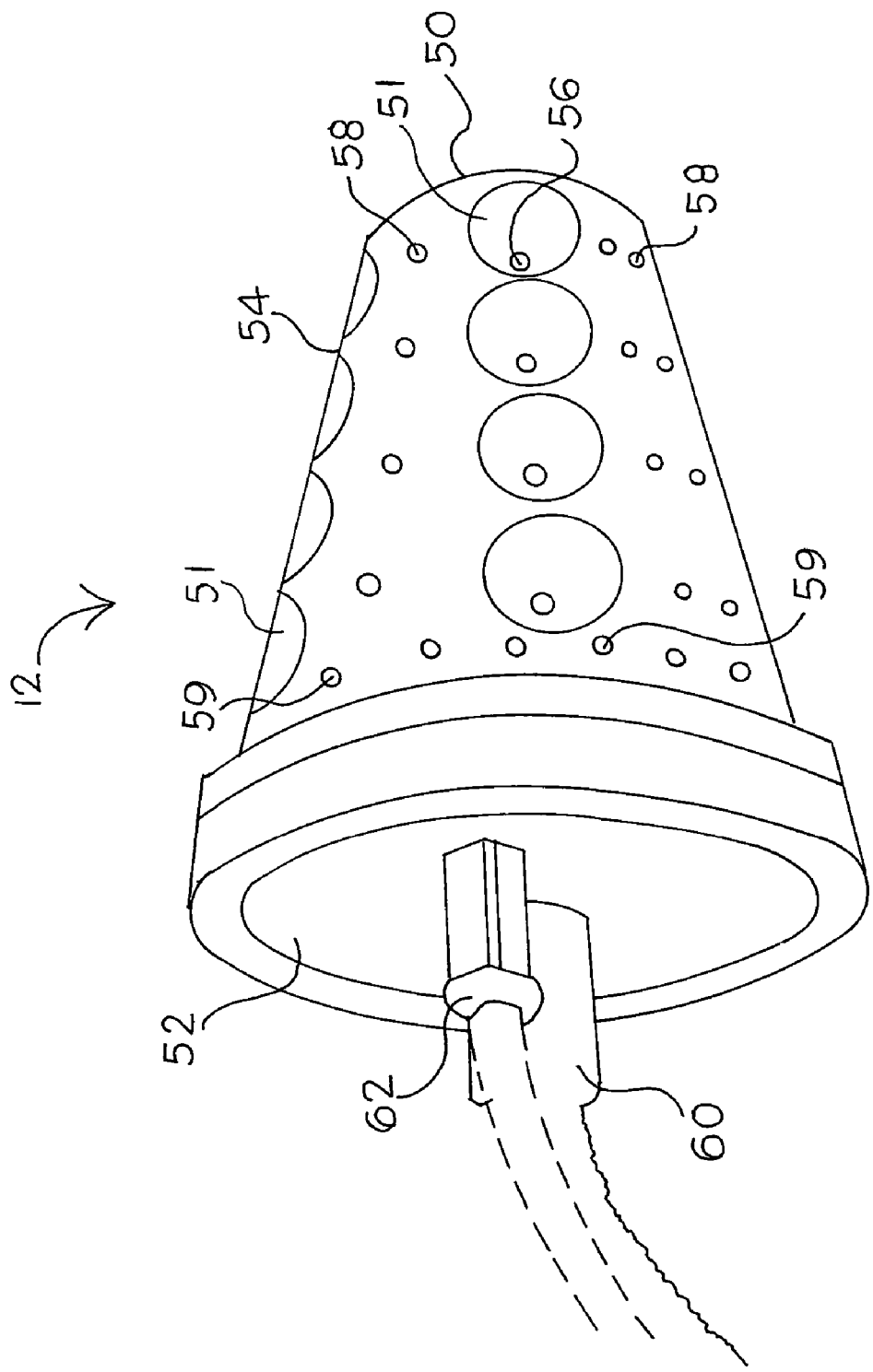
FIG. 3 is a perspective view of a mandrel according to the invention.

Mandrel 12 is used to transfer and position label sheet 10 in female portion 16. In some embodiments of the invention, as shown in FIGS. 2 and 3, mandrel 12 will have a shape and dimensions similar to male portion 20, which in many cases will be a partial conical shape. As such, mandrel 12 can have a first base 50 having a dimension D1; a second base 52 having a dimension D2, wherein D2 is greater than D1; a mandrel surface 54 circumferentially and longitudinally disposed about the first base 50 and the second base 52; a plurality of charging pins 56, positioned within a charging pin channel 57, which is positioned within generally circular charging depressions 51 positioned along the mandrel surface 54 from the first base 50 to the second base 52; a plurality of lengthwise suction holes 58 positioned along the mandrel surface 54 from the first base 50 to the second base 52; a plurality of circumferential suction holes 59 positioned along the mandrel surface 54 in proximity to the second base 52. Typically, at least the mandrel surface 54 of the mandrel 12 includes a non-conducting material that is not deformable at ambient conditions. Aside from suction holes 58 and 59 and the depressions surrounding charging pins 56, mandrel surface 54 can be smooth.

Lengthwise suction holes 58 desirably secure and hold a label sheet against mandrel surface 54. Circumferential suction holes 59 desirably hold a label sheet in a desired position and orientation on mandrel surface 54 to ensure proper positioning when inserted onto the inner wall of a female portion and ultimately, proper label placement on the labeled containers provided according to the invention. Thus the present method and device are able to minimize waste resulting from mislabeled containers.

Figure 4:
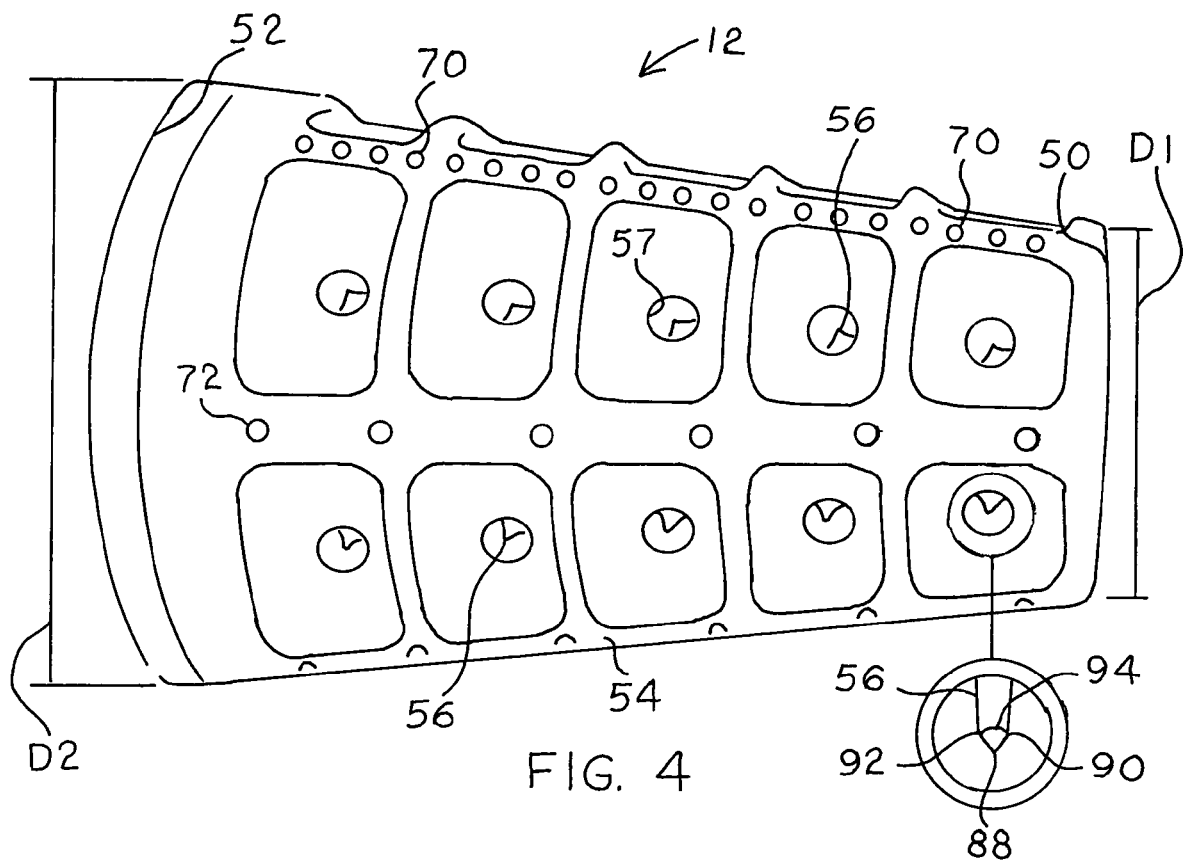
FIG. 4 is a top side elevation view of a mandrel according to the invention.
Figure 5:
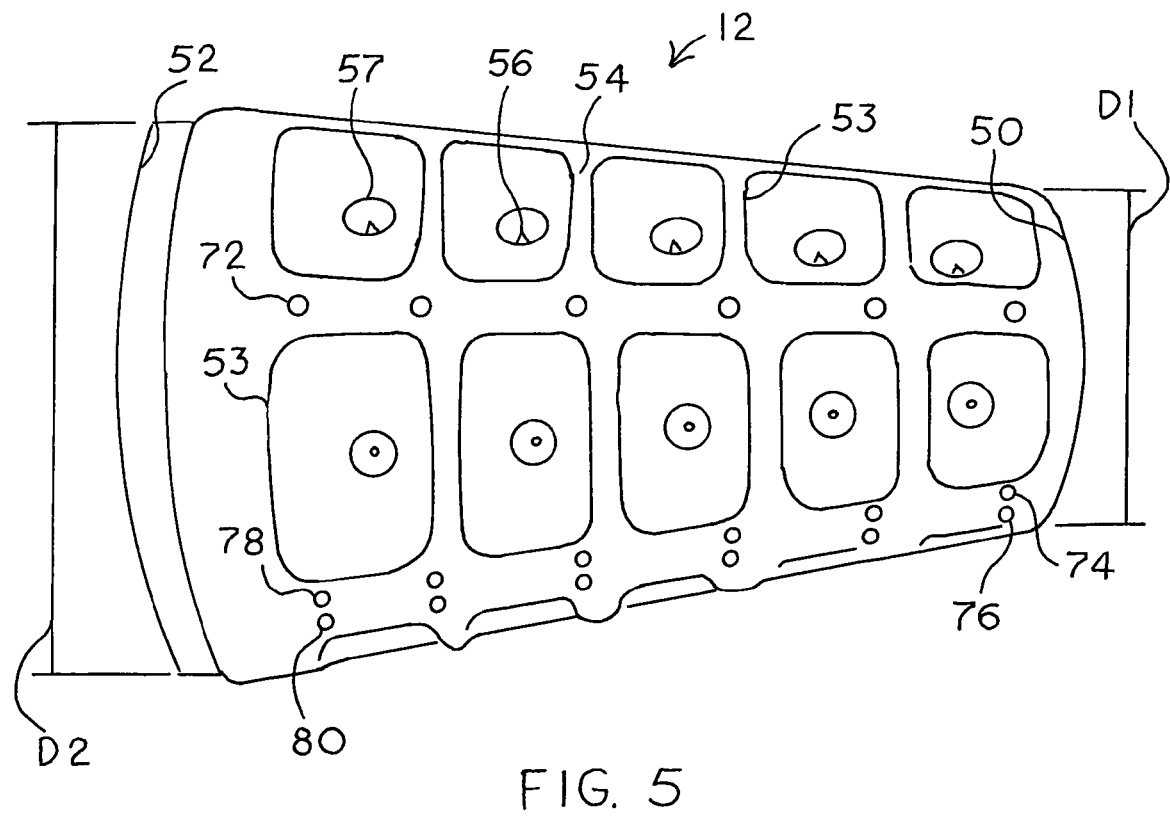
FIG. 5 is a bottom side elevation view of a mandrel according to the invention.
Figure 6:
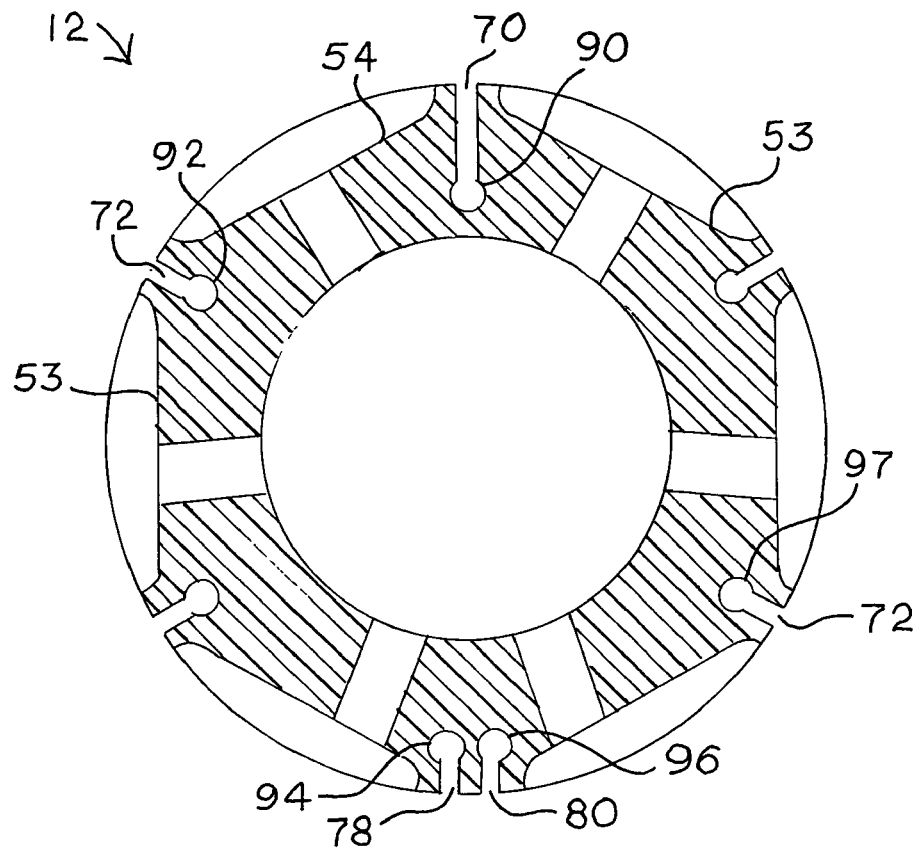
FIG. 6 is a lateral section of a mandrel according to the invention.

In other embodiments of the invention, as shown in FIGS. 4, 5 and 6, mandrel 12 has a shape and dimensions similar to male portion 20, which in many cases will be a partial conical shape. As such, mandrel 12 can have a first base 50 having a dimension D1; a second base 52 having a dimension D2, wherein D2 is greater than D1; a mandrel surface 54 circumferentially and longitudinally disposed about the first base 50 and the second base 52; a plurality of charging pins 56, within a charging pin channel 57, which is positioned within generally rectangular charging depressions 53 positioned along mandrel surface 54 from the first base 50 to the second base 52; a plurality of label adhering suction holes 70 positioned lengthwise along mandrel surface 54 from the first base 50 to the second base 52; a plurality of label wrapping suction holes 72 positioned lengthwise along mandrel surface 54 from the first base 50 to the second base 52 spaced apart from label adhering suction holes 70 and first row 74 and second row 76 each containing a plurality of overlap suction holes 78 and 80 respectively positioned lengthwise along mandrel surface 54 from the first base 50 to the second base 52 approximately oppositely opposed from label adhering suction holes 70. Typically, at least mandrel surface 54 of mandrel 12 includes a non-conducting material that is not deformable at ambient conditions. Aside from suction holes 70, 72, 78 and 80 and the depressions 53 surrounding charging pins 56, mandrel surface 54 can be smooth.

Label adhering suction holes 70 desirably secure and hold a label sheet against mandrel surface 54 when it is first placed on mandrel 12. Label wrapping suction holes 72 desirably hold a label sheet in a desired position and orientation on mandrel surface 54 as the label is wrapped around mandrel 12. First row 74 and second row 76 of overlap suction holes 78 and 80 respectively ensure proper positioning when wrapping is completed. Suction holes 70, 72, 78 and 80 hold a label in a desired position and orientation while it is inserted into a mold and transferred onto the inner wall of a female portion and ultimately, proper label placement on the labeled containers provided according to the invention. Thus the present method and device are able to minimize waste resulting from mislabeled containers. In many embodiments of the invention, D1 and D2 represent diameters of first base 50 and second base 52 respectively, which can be circular in shape.

In an embodiment of the invention, the dimension D1 can be at least 1, in some cases at least 1.5 and in other cases at least 2 cm and can be up to 12, in some cases up to 10, and in other cases up to 8 cm. The dimension D1 will depend on the dimensions of the inner surface of female portion and the desired labeled container. The dimension D1 can be any value or range between any of the values recited above.

In another embodiment of the invention, the dimension D2 can be at least 1.5, in some cases at least 2 and in other cases at least 2.5 cm and can be up to 20, in some cases up to 15, and in other cases up to 10 cm. The dimension D2 will depend on the dimensions of the inner surface of female portion, the desired labeled container and will be larger than the dimension D2. The dimension D2 can be any value or range between any of the values recited above.

Any suitable non-conducting material can be used for mandrel surface 54, so long as it is able to electrically insulate and prevent short-circuiting of charging pins 56. Suitable materials include, but are not limited to one or more materials selected from fluoropolymers, homopolymers and copolymers of fluoromonomers, homopolymers and copolymers of olefins, homopolymers and copolymers of vinyl aromatic monomers, polyesters, polyamides, polyester-amides, homopolymers and copolymers of vinyl chloride, polycarbonates, polyoxymethylene, acetal polyoxymethylene, polysulfones, ceramics, wood, glass, elastomeric polymers, combinations thereof and metals coated with one or more of the materials listed above.

Non-limiting examples of suitable fluoropolymers and homopolymers and copolymers of fluoromonomers include homopolymers and copolymers containing one or more monomers selected from chlorotrifluoroethylene, tetrafluoroethylene, trifluoroethylene, difluoroethylene, hexafluoropropylene, vinyl fluoride and $C_1$-$C_{12}$ alkyl (meth)acrylates containing from 1 to 20, in some cases 1 to 15, and in other cases from 1 to 10 fluorine atoms, depending on the number of carbon atoms in the alkyl chain. Non-limiting examples of suitable fluoropolymers include poly(vinylidene fluoride), poly(vinyl fluoride), poly(chlorotrifluoroethylene), poly(tetrafluoroethylene), poly(trifluoroethylene), the LUMIFLON® polymers available from Asahi Glass Company, Ltd., Tokyo, Japan. KYNAR® available from Atofina Chemicals, Inc., Philadelphia, Pa., HYLAR® available from Ausimont, an affiliate of the Montedison group, Milan, Italy, the NAFION®, TEFZEL®, and TEFLON® available from E.I. DuPont de Nemours and Company, Wilmington, Del., POM-PTFE™ available from Kern GmbH, Grossmaischeid, Germany, and ARNITE® available from DSM IP Assets B.V, the Netherlands.

Mandrel surface 54 has an area sufficient to support a label during the label insertion process described herein. Mandrel surface 54 supports a label near first base 50, second base 52 and the space between the various suction holes and charging depressions as described above.

Charging pins 56 comprise a metal capable of conducting electricity and can contain, without limitation, copper, iron, silver, aluminum, tungsten, manganese, nickel, chromium, manganin, constantan, nichrome, and combinations thereof. Electricity is conveyed to charging pins 56, by way of power line 60.

In an embodiment of the invention shown in FIG. 4, charging pin 56 terminates at point 88 formed by conical sides 90 and 92, which form a charging angle 94. The amount of charge transferred to a label can be controlled in part by varying charging angle 94. Thus, charging angle 94 can be at least 20, in some cases at least 25 and in other cases at least 30 degrees and can be up to 120, in some cases up to 100, in other cases up to 80, in some instances up to 60 and in other instance up to 50 degrees. Charging angle 94 is determined based on the amount of charged desired to be transferred to a label. Charging angle 94 can be any value or range between any of the values recited above.

Charging depressions 53 can have any suitable shape, but will usually have a shape that allows for adequate charge transfer from charging pins 56 to a label. As such, charging depressions 53 can have a circular, oval, elliptical, square, rectangular, triangular, pentagonal, hexagonal, heptagonal, octagonal, trapezoidal, parallelogram-like, or other suitable shape.

Charging depressions 53 extend a depth into mandrel surface 54 that allows for adequate charge transfer from charging pins 56 to a label. As such, charging depressions 53 can have a depth of at least about 0.04 inches (1 mm), in some cases at least about 0.1 inches (2.5 mm) and in other cases at least about 0.25 inches (6.4 mm) and can be up to about 2 inches (51 mm), in some cases up to about 1.75 inches (44.5 mm) and up to about 1.5 inches (38 mm). The depth of charging depressions 53 is determined based on the amount of charge desired and the characteristics of charging pins 56. The depth of charging depressions 53 can be any value or range between any of the values recited above.

The shape of charging depressions 53 formed in mandrel surface 54 can have an area of at least about 0.01 $in^2$ (6.5 $mm^2$), in some cases at least about 0.05 $in^2$ (32 $mm^2$), and in other cases at least about 0.1 $in^2$ (65 $mm^2$) and can be up to about 4 $in^2$ (2,581 $mm^2$), in some cases up to about 2 $in^2$ (1290 $mm^2$) and in other cases up to about 1 $in^2$ (645 $mm^2$). The area of charging depressions 53 is determined based on the amount of charge desired and the characteristics of charging pins 56. The area of charging depressions 53 can be any value or range between any of the values recited above.

Referring to FIG. 2, vacuum is applied to mandrel 12 by way of vacuum line 62. When lengthwise vacuum valve 64 is open, vacuum is pulled through lengthwise suction holes 58 via lengthwise vacuum channel 66. When circumferential vacuum valve 68 is open, vacuum is pulled through circumferential suction holes 59 via circumferential vacuum channel 67.

Referring to FIGS. 4, 5, and 6, vacuum to label adhering suction holes 70 is provided via label adhering vacuum channel 90, which is located similarly to lengthwise suction holes 58 via lengthwise vacuum channel 66 as shown in FIG. 2. The vacuum to wrapping suction holes 72 is provided via wrapping vacuum channel 92 similarly to circumferential suction holes 59 and circumferential vacuum channel 67 as shown in FIG. 2. Vacuum to overlap suction holes 78 and 80 is provided by overlap vacuum channels 94 and 96 respectively. Typically, the vacuum supply to vacuum channels 92, 94 and 96 are provided from the same source and controlled via the same valves or other mechanism and the vacuum to label adhering vacuum channel 90 is supplied and controlled separately.

In embodiments of the invention, vacuum line 62 and suction holes 58 and 59 can be adapted to provide a "puff" of compressed air to effect transfer of a label from mandrel 12 to the inner wall of female portion 16. Similarly, vacuum channels 90, 92, 94 and 96 and suction holes 70, 72, 78 and 80 can be adapted to provide a "puff" of compressed air to effect transfer of a label from mandrel 12 to the inner wall of female portion 16.

In an embodiment of the invention, remover 14 can be attached to mandrel 12 (see FIG. 2). In this embodiment, vacuum line 62 is used to apply vacuum via remover channel 72. The vacuum applied via remover channel 72 can be controlled by a regulating valve (not shown).

The vacuum can be applied, as a non-limiting example, by using a vacuum pump or a venturi attached to a compressed air line as is known in the art.

Mandrels have been used for in-mold labeling in injection molding operations as disclosed in U.S. Pat. No. 6,007,759. The disclosed injection molding mandrels include an electrically conducting layer consisting of a flexible foam material as an outer surface. Using such an outer surface on the present mandrel is undesirable as it leads to inconsistent and poor label placement on the inner wall of the female portion because the foam material cannot be machined to exact measurements to provide for tight tolerances and clearances as the present mandrel can. Additionally, the thickness of the foam material can decrease with use due to wear, leading to further inconsistent label placement.

As indicated above, mandrel 12 is used to transfer and position a label sheet 10 to the inner wall of female portion 16. Once label sheet 10 is positioned, female portion 16 and male portion 20 of two-part mold 18 can be utilized to make labeled container 24. Thus, two-part mold tool 18 for molding the expanded plastic container includes a male portion 20 and a female portion 16 which are assembled to form a mold cavity defining the container having, at least one cavity for heating and/or cooling fluid in at least one of the male and/or female portions adjacent the mold cavity and extending adjacent at least that part of the cavity defining the side wall(s) of the container, conduit means for supplying steam to the heating/cooling cavity, and a passageway means through which steam is injected into the mold cavity.

In the present invention, labeled container 24 is molded in a horizontal orientation with its mouth and base in a plane and steam for cooking plastic material is injected at least at the base end (male portion) of the mold adjacent the base of the container. The two-part mold tool 18 can include a male portion 20 that includes a core section and an outer shell fitted over the core section so as to provide a heating/cooling cavity within the outer shell. The outer surface of the shell molds the internal surface of the container and the heating/cooling cavity can be substantially coextensive with the shell. The male portion 20 cooperates with a female portion 16, with label sheet 10 positioned along an inner wall, assembled over the male portion to define the mold cavity. The female portion 16 can include an inner female shell which molds the external wall of the container to the label sheet and a mold member fitted over the outside of the female shell so as to provide a heating/cooling cavity substantially coextensive with the female shell and about the outside of the mold cavity. Suitable conduits are arranged to supply flushing steam or cooling liquid to the heating/cooling cavities. One of the conduits is connectable, under control of a first valve means, to a passageways means communicating with the end of the mold cavity to permit steam to be injected into the mold to cook the molding material.

Figure 7:
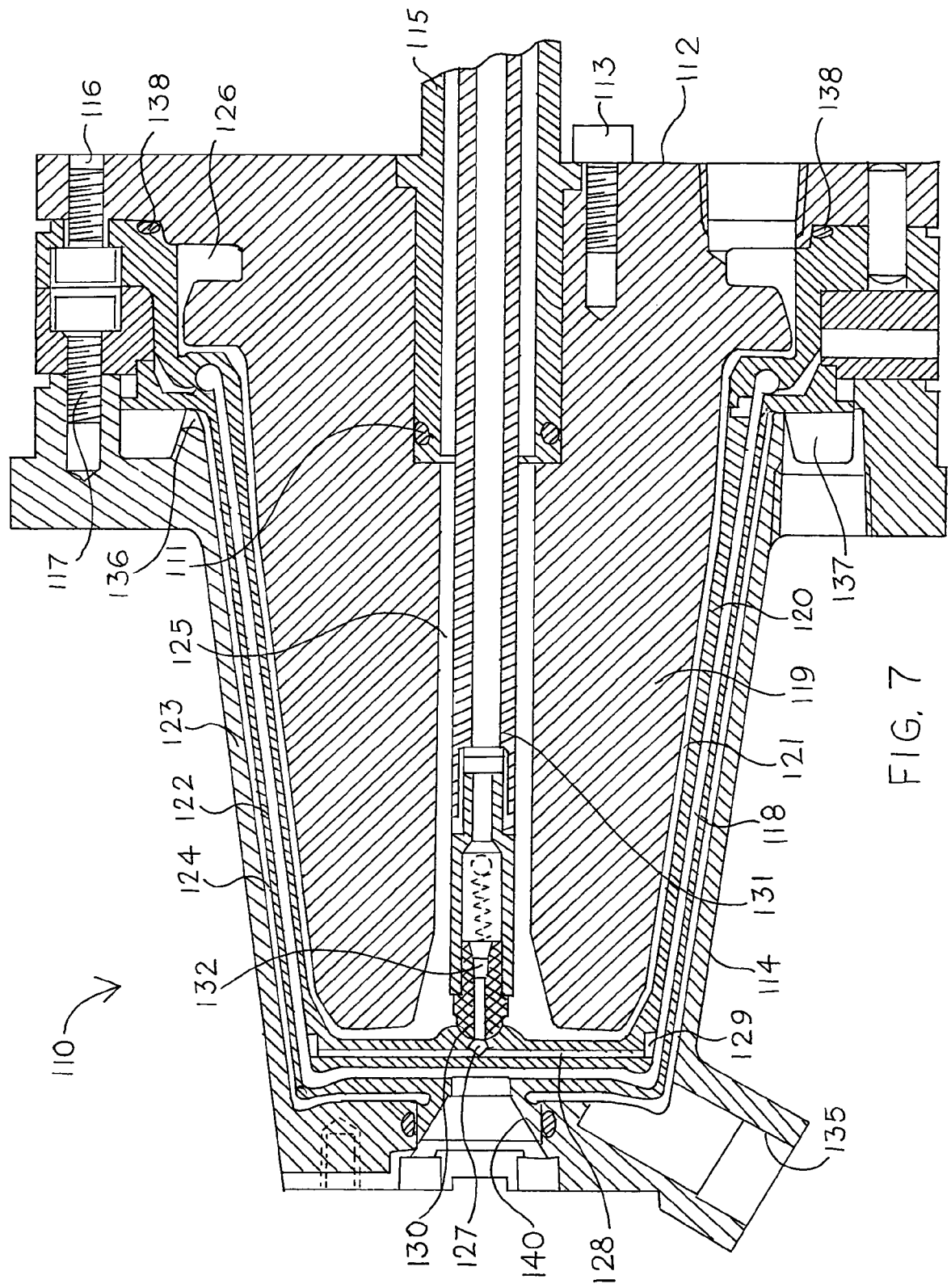
FIG. 7 is an axial section illustrating assembled male and female portions of a two-part mold according to the invention.

An embodiment of the mold cavity used in the present invention is shown in FIG. 7. The two-part mold tool 110 for producing a labeled container according to the invention molds the container with its base and mouth directed horizontally. The tool includes male portion 112 and female portion 114 which are assembled to form a mold cavity 118 for the container to be molded. The male portion 112 has a core section 119 and an outer shell 120 fitted over the core section so as to leave a heating/cooling cavity 121 between the outer shell and the core section. The external surface of the outer shell forms a molding surface for the internal surfaces of the base and side walls of the container and the heating/cooling cavity 121 is substantially coextensive with the base and side walls of the mold cavity. The female portion 114 includes an inner female shell 122 which molds the external surfaces of the base and side walls of the container and a top mold member 123 which is fitted over the outside of the female shell so as to provide a heating/cooling cavity 124 between the female shell and the top mold member. This outer heating/cooling cavity is substantially coextensive with the base and side walls of the mold cavity. In an embodiment of the invention, the molding surface of female shell 122 is smooth.

The core section and outer shell of the male portion 112 can be secured together at an end of the mold tool by machine screws 116 and the inner female shell and a mold member of the female portion 114 can be secured together by machine screws 117. O-ring seals 138 can be disposed between the components of the mold parts, at appropriate positions, to seal the components together.

Extending centrally through the male portion 119 to a position adjacent the left end thereof is a central conduit 125 through which flushing steam for heating the mold during preheating or cooking or cooling liquid for cooling the mold is alternatively supplied to the inner cavity 121. Flushing steam or cooling liquid is delivered to the conduit 125 by a pipe 115 that can be coupled to the male portion by machine screws 113 and sealed to the conduit by an O-ring seal 111. Steam or liquid exits the cavity 121 through an annular outlet 126 adjacent the right end of the mold tool. At its left end, the conduit 125 is connected, through a valve port 127 to diametrically disposed passageways 128 communicating with the mold cavity 118 via an annular groove (not shown) in the outer surface of the outer shell 120. The valve port 127 can be controlled by a spring loaded valve member 130 disposed at the left end of the conduit 125 and actuated by a hollow valve rod 131 projecting through the conduit to a suitable pneumatic actuating mechanism. The valve member 130 has an axial passageway 132 connected to the hollow actuating rod 131 to permit compressed air to be supplied through the rod, the valve member and the passageways 128 into the mold cavity so as to assist in ejecting a molded container from the mold cavity 118 at the end of the molding cycle.

Flushing steam and cooling liquid are alternatively supplied to the outer heating/cooling cavity 124 via a port 135 in the top mold member 123, which port is connected to a suitable supply conduit (not shown). The steam and liquid exit from the cavity via an annular outlet 136 and annular manifold 137 adjacent the right end of the mold cavity.

Expandable and/or pre-expanded resin beads of a suitable molding material for the container as described below can be supplied to the mold cavity through a conduit (not shown) coupled to the top mold member 123 by a coupling unit (not shown) attached to the top mold member and connected to a funnel shaped port 140 in the inner female shell 122 which communicates with mold cavity 118. Delivery of expandable and/or pre-expanded resin beads to mold cavity 118 can be assisted by the supply of compressed air through an air nozzle (not shown) also coupled to port 140. Also, compressed air can be supplied to the nozzle when the female portion 114 and male portion 112 are separated at the end of a molding cycle in order to retain the molded container on male portion 112 preparatory to removal from the tool by remover 14.

In order to mold a container, the female portion 114 is assembled to the male portion 112, as shown in FIG. 7, and expandable and/or pre-expanded resin beads are injected into the mold cavity 118 via the funnel shaped port 140 in the female shell 122. When the mold cavity is full, steam can be injected through the conduit 125 and the port 135 in order to flush the inner and outer cavities 121 and 124 with steam and thereby heating the mold. At the appropriate time in the molding cycle, the pneumatically operated valve rod 131 is actuated in order to withdraw the valve member 130 and permit steam to enter the mold cavity 118 via port 127, the passageways 128 and the annular groove 129 in order to cook the expandable and/or pre-expanded resin beads in the mold cavity.

At the end of the cook cycle, the valve member 127 is closed and cooling liquid is supplied, via the conduit 125 and port 135, to the heating/cooling cavities 121 and 124 in order to cool the mold tool and the molded container, whereafter the male portion 112 and female portion 114 are separated and compressed air is supplied through the hollow valve rod 131 and valve member 130 to the passageways 128 in order to blow air into the molded cup and facilitate ejection of the cup from the male portion 112.

Figure 8:
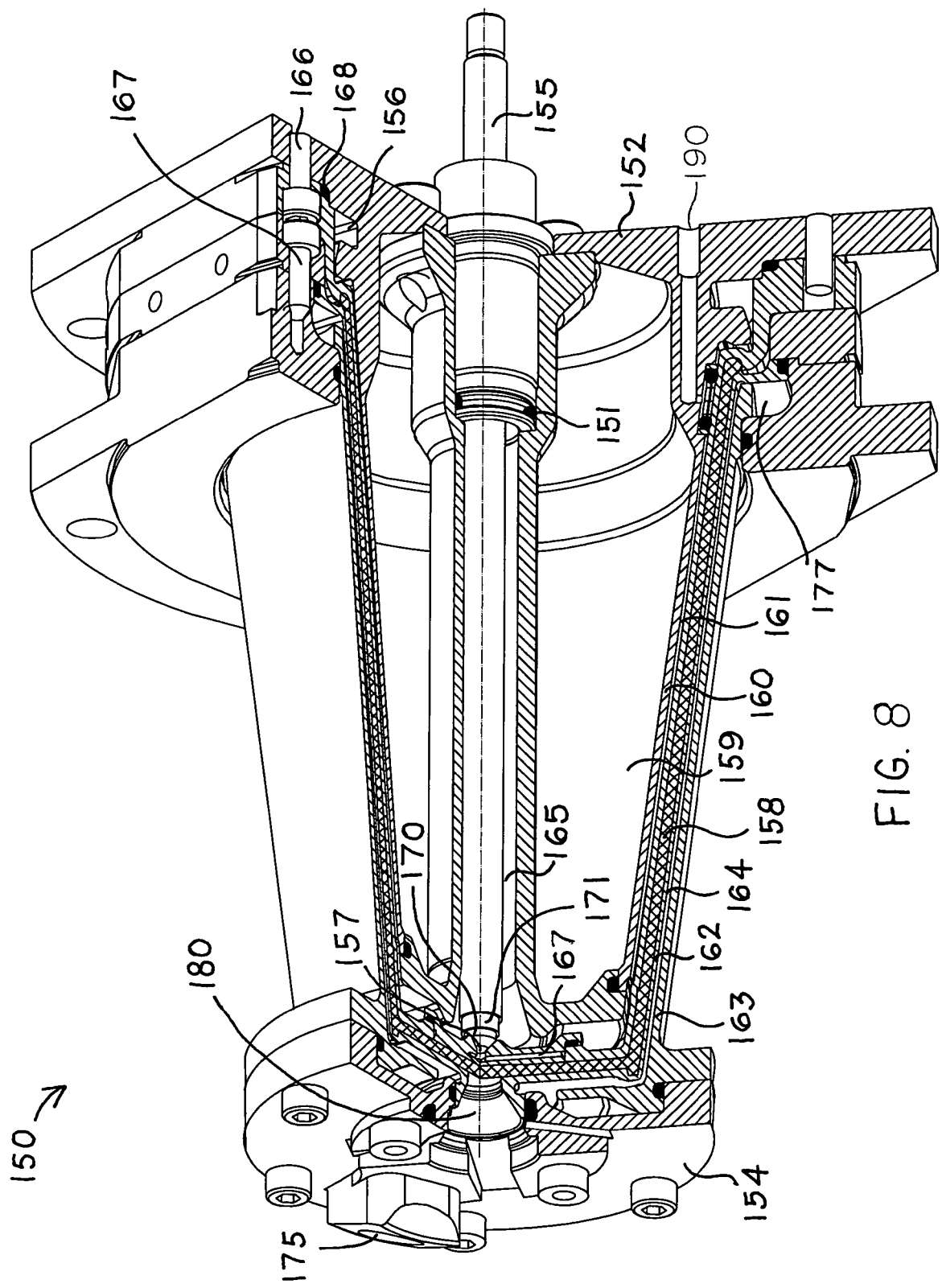
FIG. 8 is a partial axial section illustrating assembled male and female portions of a two-part mold according to the invention.

Further embodiments of the mold cavity used in the present invention are shown in FIG. 8. The two-part mold tool 150 for producing a labeled container according to the invention molds the container with its base and mouth directed horizontally. The tool includes male portion 152 and female portion 154 which are assembled to form a mold cavity 158 for the container to be molded. The male portion 152 has a core section 159, which can be solid or include hollow portions, and an outer shell 160 fitted over the core section so as to leave a heating/cooling cavity 161 between the outer shell and the core section. The external surface of the outer shell forms a molding surface for the internal surfaces of the base and side walls of the container and the heating/cooling cavity 161 is substantially coextensive with the base and side walls of the mold cavity. The female portion 154 includes an inner female shell 162 which molds the external surfaces of the base and side walls of the container and a top mold member 163 which is fitted over the outside of the female shell so as to provide a heating/cooling cavity 164 between the female shell and the top mold member. This outer heating/cooling cavity is substantially coextensive with the base and side walls of the mold cavity. In an embodiment of the invention, the molding surface of female shell 162 is smooth.

The core section and outer shell of the male portion 152 can be secured together at an end of the mold tool by bolts 166 and the inner female shell and a mold member of the female portion 154 can be secured together by bolts 167. O-ring seals 168 can be disposed between the components of the mold parts, at appropriate positions, to seal the components together.

Extending centrally through the core section 169 of male portion 152 to a position adjacent the left end thereof is a central conduit 165 through which flushing steam for heating the mold during preheating or cooking or cooling liquid for cooling the mold is alternatively supplied to the inner cavity 161. Flushing steam or cooling liquid is delivered to the conduit 165 by a pipe 155 that can be coupled to the male portion by machine screws and sealed to the conduit by an O-ring seal 151. Steam or liquid exits the cavity 161 through an annular outlet 156 adjacent the right end of the mold tool. At its left end, the conduit 165 is connected, through a valve port 157 to diametrically disposed passageways 168 communicating with the mold cavity 158 via annular groove 168 in the left hand portion of the outer shell 160. In this embodiment, annular groove 168 is positioned between valve port 157 and base end 180 of mold cavity 158. The valve port 157 can be controlled by a spring loaded valve member 170 disposed at the left end of the conduit 165 and actuated by a hollow valve rod 171 projecting through the conduit to a suitable pneumatic actuating mechanism. The valve member 170 has an axial passageway (not shown) connected to the hollow valve or actuating rod 171 to permit steam to be supplied through the rod, the valve member and the cook lid 167 to provide additional heat to the mold cavity 158 during the molding cycle.

Flushing steam and cooling liquid are alternatively supplied to the outer heating/cooling cavity 164 via port 175 in the left end of female portion 154, which port 175 is connected to a suitable supply conduit (not shown). The steam and liquid exit from the cavity via an annular manifold 177 adjacent the right end of the mold cavity.

At the end of the molding cycle, compressed air can be supplied through passageway 190 in order to blow air into the molded cup and facilitate ejection of the cup from the male portion 152.

In an embodiment of the invention, heat, which can be supplied in the form of steam as indicated above, can be applied in a heat cycle in the female portion that is independent from heat applied in a heat cycle in the male portion.

Expandable and/or pre-expanded resin beads of a suitable molding material for the container as described below can be supplied to the mold cavity through a conduit (not shown) coupled to the left of female portion 154 by a coupling unit (not shown) attached to female portion 154 and connected to a funnel shaped port 180 in the inner female shell 162 which communicates with mold cavity 158. Delivery of expandable and/or pre-expanded resin beads to mold cavity 158 can be assisted by the supply of compressed air through an air nozzle (not shown) also coupled to port 180. Also, compressed air can be supplied to the nozzle when the female portion 154 and male portion 152 are separated at the end of a molding cycle in order to retain the molded container on male portion 152 preparatory to removal from the tool by remover 14.

In order to mold a container, the female portion 154 is assembled to the male portion 152, as shown in FIG. 8, and expandable and/or pre-expanded resin beads are injected into the mold cavity 158 via the funnel shaped port 180 in the female portion 154. When the mold cavity is full, steam can be injected through the conduit 165 and the port 175 in order to flush the inner and outer cavities 161 and 164 with steam and thereby heating the mold. At the appropriate time in the molding cycle, the pneumatically operated valve rod 171 is actuated in order to withdraw the valve member 170 and permit steam to enter the mold cavity 158 via port 157, the passageways 168 and the annular groove in order to cook the expandable and/or pre-expanded resin beads in the mold cavity.

At the end of the cook cycle, the valve member 157 is closed and cooling liquid is supplied, via the conduit 155 and the port, to the heating/cooling cavities 161 and 164 in order to cool the mold tool and the molded container, whereafter the male portion 152 and female portion 154 are separated and compressed air is supplied through the hollow valve rod 171 and valve member 170 to the passageways 168 in order to blow air into the molded cup and facilitate ejection of the cup from the male portion 152.

In an embodiment of the invention, heat, which can be supplied in the form of steam as indicated above, can be applied in a heat cycle in the female portion that is independent from heat applied in a heat cycle in the male portion.

Additional embodiments of the invention provide coordination between the positioning of male portion 20, female portion 16 and mandrel 12/remover 14 and the molding cycle described above. When male portion 20 and female portion 16 are joined to form mold 18, as shown in FIG. 1F, a molding cycle begins. Referring to FIG. 7 (while the same steps can be followed using the two-part mold shown in FIG. 8), the first step in the molding cycle includes adding expandable or pre-expanded resin beads to the mold cavity. Next, a dwell period can be initiated, whereby steam is applied to female portion 16 and male portion 20 as described above. The dwell time can be at least 2, in some cases at least 3 and in other cases at least 5 seconds and can be up to 60, in some cases up to 45 and in other cases up to 30 seconds and can be any length of time or range between any of the lengths of time described above.

Following the dwell period, a cook period can be performed, whereby steam enters the mold cavity as described above. The cook period can be at least 5, in some cases at least 7 and in other cases at least 10 seconds and can be up to 60, in some cases up to 45 and in other cases up to 30 seconds and can be any length of time or range between any of the lengths of time described above.

Following the cook period, a cooling period can be performed, whereby cooling water is flushed through female portion 16 and male portion 20 as described above. The cooling period can be at least 5, in some cases at least 10 and in other cases at least 15 seconds and can be up to 60, in some cases up to 45 and in other cases up to 30 seconds and can be any length of time or range between any of the lengths of time described above.

Cooling water can continue to flow through female portion 16 and male portion 20 while the steps described in FIGS. 1A through 1E are conducted. Typically, the cooling water flow can be stopped after the steps shown in FIG. 1C, 1D or 1E. Cooling the male portion makes the removal of labeled container 24 easier (helps to prevent any sticking to the female portion).

Labeled container 24 typically then contains molded expandable resin beads or pre-expanded resin beads and has a density of at least 0.5, in some cases at least 1, in other cases at least 1.5, and in some instances at least 2 lb./ft.$^3$ and can be up to 12, in some cases up to 10, and in other cases up to 8 lb./ft.$^3$. The density of the molded expandable resin beads or pre-expanded resin beads can be any value or range between any of the values recited above.

Generally, the expandable resin beads are prepared by dispersing a monomer mixture in an aqueous system; polymerizing the monomer mixture in the presence of a free radical polymerization initiator to form a dispersion of resin beads; screening the resin beads to remove beads with undesired dimensions; and impregnating the resin beads with a blowing agent.

Any suitable expandable resin beads or pre-expanded resin beads can be used in the invention. Suitable resin beads include those with dimensions that allow the expandable and/or pre-expanded beads to be fed to the two-part mold as described herein without clogging or obstructing the feed channels in the mold and are able to expand and fuse together to form a molded container as described herein. Suitable expandable resin beads, include but are not limited to, those that contain homopolymers of vinyl aromatic monomers; copolymers of at least one vinyl aromatic monomer with one or more of divinylbenzene, conjugated dienes, alkyl (meth) acrylates, (meth)acrylonitrile, olefins, and/or maleic anhydride; polyolefins; polycarbonates; polyesters; polyamides; natural rubbers; synthetic rubbers; and combinations thereof.

Suitable vinyl aromatic monomers include, but are not limited to, styrene, isopropylstyrene, alpha-methylstyrene, nuclear methylstyrenes, chlorostyrene, tert-butylstyrene. In an embodiment of the invention, the vinyl aromatic monomers can be copolymerized with one or more other monomers, non-limiting examples being divinylbenzene, conjugated dienes (non-limiting examples being butadiene, isoprene, 1,3- and 2,4-hexadiene), alkyl methacrylates, alkyl acrylates, acrylonitrile, and maleic anhydride, where the vinyl aromatic monomer is present in at least 50% by weight of the copolymer. In many embodiments of the invention, styrenic polymers are used, particularly polystyrene, however, other suitable polymers can be used, such as polyolefins (e.g. polyethylene, polypropylene), polycarbonates, polyphenylene oxides, and mixtures thereof.

In a particular embodiment of the invention, the expandable resin beads include expandable polystyrene (EPS) particles.

In the present invention, the resin beads are formed via polymerization in a suspension process, from which essentially spherical resin beads are produced. These beads are useful as resin beads for making expanded polymer containers. However, polymers derived from solution and bulk polymerization techniques that are extruded and cut into particle sized resin bead sections of appropriate dimensions can also be used.

In an embodiment of the invention, expandable resin beads or pre-expanded resin beads containing any of the above-mentioned polymers have an average particle size of at least 10, in some situations at least 25, in some cases at least 50, in other cases at least 75, in some instances at least 100 and in other instances at least 150 μm. Also, the expandable resin beads or pre-expanded resin beads can have an average particle size of up to 600, in some instances up to 550, in other instances up to 500, in some cases up to 450, in other cases up to 400, and in some situations up to 350 μm. The maximum average size of the expandable resin beads or pre-expanded resin beads will be limited by the dimensions of the two-part mold to allow for feeding of the expandable and/or pre-expanded resin beads into the mold as described herein. The expandable resin beads or pre-expanded resin beads used in this embodiment can be any value or can range between any of the values recited above.

The number average particle size and size distribution of the expandable resin beads or pre-expanded resin beads can be determined using low angle light scattering, which can provide a weight average value. As a non-limiting example, a Model LA-910 Laser Diffraction Particle Size Analyzer available from Horiba Ltd., Kyoto, Japan can be used In an embodiment of the invention, the polymers in the resin bead have a weight average molecular weight (Mw) of at least 25,000, in some cases at least 50,000, and in other cases at least 75,000 and the Mw can be up to 1,000,000, in some cases up to 750,000 and in other cases up to 500,000. The weight average molecular weight of the polymers in the resin bead can be any value or can range between any of the values recited above.

In an embodiment of the invention, after polymerization, the resin beads are isolated and dried and then suspended in an aqueous system. As used herein, "aqueous system" means a solution or mixture containing at least 50 wt. % water as the solution medium and/or continuous phase. Dispersing aids, nonionic surfactants and/or waxes can also be added to the aqueous system. When the resin beads are dispersed in the aqueous system, one or more blowing agents can be added.

The expandable thermoplastic particles or resin beads can optionally be impregnated using any conventional method with a suitable blowing agent. As a non-limiting example, the impregnation can be achieved by adding the blowing agent to the aqueous suspension during the polymerization of the polymer, or alternatively by re-suspending the particles or resin beads in an aqueous medium and then incorporating the blowing agent as taught in U.S. Pat. No. 2,983,692. Any gaseous material or material which will produce gases on heating can be used as the blowing agent. Conventional blowing agents include aliphatic hydrocarbons containing 4 to 6 carbon atoms in the molecule, such as butanes, pentanes, hexanes, and the halogenated hydrocarbons, e.g. CFC's and HCFC's, which boil at a temperature below the softening point of the polymer chosen. Mixtures of these aliphatic hydrocarbon blowing agents can also be used.

Alternatively, water can be blended with these aliphatic hydrocarbons blowing agents or water can be used as the sole blowing agent as taught in U.S. Pat. Nos. 6,127,439; 6,160,027; and 6,242,540 in these patents, water-retaining agents are used. The weight percentage of water for use as the blowing agent can range from 1 to 20%. The texts of U.S. Pat. Nos. 6,127,439, 6,160,027 and 6,242,540 are incorporated herein by reference.

In an embodiment of the invention, the blowing agent can include one or more selected from nitrogen, sulfur hexafluoride ($SF_6$), argon, carbon dioxide, 1,1,1,2-tetrafluoroethane (HFC-134a), 1,1,2,2-tetrafluoroethane (HFC-134), 1,1,1,3,3-pentafluoropropane, difluoromethane (HFC-32), 1,1-difluoroethane (HFC-152a), pentafluoroethane (HFC-125), fluoroethane (HFC-161) and 1,1,1-trifluoroethane (HFC-143a), methane, ethane, propane, n-butane, isobutane, n-pentane, isopentane, cyclopentane, neopentane, hexane, azodicarbonamide, azodiisobutyro-nitrile, benzenesulfonylhydrazide, 4,4-oxybenzene sulfonyl-semicarbazide, p-toluene sulfonyl semi-carbazide, barium azodicarboxylate, N,N'-dimethyl-N,N'-dinitrosoterephthalamide, trihydrazino triazine, mixtures of citric acid and sodium bicarbonate, and combinations thereof.

In an embodiment of the invention, the blowing agent can be present in the expandable resin beads or pre-expanded resin beads at a level of less than 14 wt %, in some situations less than 6 wt %, in some cases ranging from about 2 wt % to about 5 wt %, and in other cases ranging from about 2.5 wt % to about 3.5 wt % based on the weight of the resin bead.

Any suitable dispersing aid can be used in the present invention. Suitable dispersing aids prevent the resin beads from sticking together when dispersed in the aqueous system. Examples of suitable dispersing aids include, but are not limited to finely divided water-insoluble inorganic substances such as tricalcium phosphate, zinc oxide, bentonite, talc, kaolin, magnesium carbonate, aluminum oxide and the like as well as water-soluble polymers such as polyvinyl alcohol, alkyl aryl sulfonates, hydroxyethyl cellulose, polyacrylic acid, methyl cellulose, polyvinyl pyrrolidone, and the like, sodium linear alkyl benzene sulfonates, such as sodium dodecylbenzene-sulfonate, and combinations thereof. In an embodiment of the invention, the dispersing aid includes tricalcium phosphate together with a sodium linear alkylbenzene sulfonate. The amount of the dispersing aid necessary will vary depending on a number of factors but will generally be at least about 0.01, in some cases at least about 0.05, and in other cases at least about 0.1 and can be up to about 2, in some cases up to about 1, and in other cases up to about 0.75 parts by weight per 100 parts by weight of resin beads. The amount of the dispersing aid can be any value or can range between any of the values recited above.

One or more non-ionic surfactants can be included such as polyoxyalkylene derivatives of sorbitan fatty acid esters, such as $C_8$ to $C_{32}$ linear or branched with up to five units of unsaturation, non-limiting examples being oleates, stearates, monolaurates and monostearates, an ethylene oxide/propylene oxide block copolymer, or other non-ionic or anionic surface active agent can be added to the aqueous suspension if desired. In an embodiment of the invention, the amount of surfactant is at least 0.01, in some cases at least 0.05, and in other cases at least 0.1 and can be up to 2, in some cases up to 1, and in other cases up to 0.75 parts by weight per 100 parts by weight of resin beads. The amount of surfactant can be any value or can range between any of the values recited above. In an embodiment of the invention, the HLB of the above-mentioned polyoxyalkylene containing surfactants is at least 8, in some cases at least 10 and in other cases at least 12 and can be up to 22, in some cases up to 20 and in other cases at least 18. The HLB of the polyoxyalkylene containing surfactants can be any value or can range between any of the values recited above. The non-ionic surfactants can aid in the formation of fine cell structure in the expanded resin beads.

The waxes used in the present invention, at atmospheric pressure, are typically solid at 20° C. and below, in some cases 25° C. and below, and in other cases 30° C. and below, and are liquid at 125° C. and above, in some cases 150° C. and above, and in other cases 200° C. and above. The physical properties of the waxes used in the present invention are selected to aid in the formation of fine cell structure in the expanded resin beads.

In an embodiment of the invention, the waxes are selected from natural and/or synthetic waxes. As such, the waxes used in the present invention can be one or more materials selected from $C_{10}$ to $C_{32}$, in some instances $C_{12}$ to $C_{32}$, in some cases $C_{14}$ to $C_{32}$, and in other cases $C_{16}$ to $C_{32}$ linear, branched or cyclic alkyl, alkenyl, aryl, alkaryl, or aralkyl alcohols; $C_{10}$ to $C_{32}$, in some instances $C_{12}$ to $C_{32}$, in some cases $C_{14}$ to $C_{32}$, and in other cases $C_{16}$ to $C_{32}$ linear, branched or cyclic alkyl, alkenyl, aryl, alkaryl, or aralkyl carboxylic acids and/or their corresponding ammonium and metal salts or $C_1$ to $C_{32}$, in some instances $C_{12}$ to $C_{32}$, in some cases $C_{14}$ to $C_{32}$, and in other cases $C_{16}$ to $C_{32}$ linear, branched or cyclic alkyl, alkenyl, aryl, alkaryl, or aralkyl esters; $C_{10}$ to $C_{32}$, in some instances $C_{12}$ to $C_{32}$, in some cases $C_{14}$ to $C_{32}$, and in other cases $C_{16}$ to $C_{32}$ linear, branched or cyclic alkyl, alkenyl, aryl, alkaryl, or aralkyl hydrocarbons; polyethylene; polypropylene; polyester; polyether; and combinations thereof, so long as they meet a combination of liquid and solid temperatures as defined above.

The polyethylene, polypropylene, polyester, and polyether waxes can have a molecular weight (Mw) of from about 1,000 to about 100,000 so long as they meet a combination of liquid and solid temperatures as defined above In an embodiment of the invention, the amount of wax is at least 0.01, in some cases at least 0.05, and in other cases at least 0.1 and can be up to 2, in some cases up to 1, and in other cases up to 0.75 parts by weight per 100 parts by weight of expandable resin beads or pre-expanded resin beads. The amount of wax can be any value or can range between any of the values recited above.

The resin beads used in the invention are advantageously solid particles in the form of thermoplastic resin particles produced from suspension polymerization as indicated above. The polymer is formed as a slurry of finely divided particles in the aqueous suspension. The particles are recovered by washing and drying.

In an embodiment of the invention, the resulting resin beads can be screened to remove any resin beads with particle sizes that are too large. In many cases, resin beads having a particle size greater than 600 µm, in some cases greater than 500 µm and in other cases greater than 400 µm are removed by screening.

The impregnated resin beads can include an interpolymer of a polyolefin and in situ polymerized vinyl aromatic monomers and optionally other expandable polymers.

In embodiments of the invention, the interpolymer of a polyolefin and in situ polymerized vinyl aromatic monomers is one or more of those described in U.S. Pat. Nos. 3,959,189; 4,168,353; 4,303,756, 4,303,757 and 6,908,949, the relevant portions of which are herein incorporated by reference. A non-limiting example of such interpolymers that can be used in the present invention include those available under the trade name ARCEL®, available from NOVA Chemicals Inc., Pittsburgh, Pa. and PIOCELAN®, available from Sekisui Plastics Co., Ltd., Tokyo, Japan.

In embodiments of the invention, the impregnated resin beads are partially expanded or "pre-expanded" prior to being used in the molding equipment according to the invention. Thus, the resin beads can be pre-expanded to a bulk density of at least 0.5 lb/ft$^3$ (0.008 g/cc), in some cases at least 1.25 lb/ft$^3$ (0.02 g/cc), in other cases at least 1.5 lb/ft$^3$ (0.024 g/cc), in some situations at least 1.75 lb/ft$^3$ (0.028 g/cc), in some circumstances at least 2 lb/ft$^3$ (0.032 g/cc) in other circumstances at least 3 lb/ft$^3$ (0.048 g/cc) and in particular circumstances at least 3.25 lb/ft$^3$ (0.052 g/cc) or 3.5 lb/ft$^3$ (0.056 g/cc). When non-expanded resin beads are used higher bulk density beads can be used. As such, the bulk density can be as high as 40 lb/ft$^3$ (0.64 g/cc). The bulk density of the pre-expanded resin beads can be any value or range between any of the values recited above.

The bulk density of the polymer particles, resin beads and/or prepuff particles is determined by weighing a known volume of polymer particles, beads and/or prepuff particles (aged 24 hours at ambient conditions).

The expansion step is conventionally carried out by heating the impregnated beads via any conventional heating medium, such as steam, hot air, hot water, or radiant heat. One generally accepted method for accomplishing the pre-expansion of impregnated thermoplastic particles is taught in U.S. Pat. No. 3,023,175, the relevant portions of which are incorporated herein by reference.

In many embodiments of the invention, the pre-expanded resin beads have an average particle size of at least 10, in some situations at least 25, in some cases at least 50, in other cases at least 75, in some instances at least 100 and in other instances at least 150 µm. Also, the pre-expanded resin beads can have an average particle size of up to 600, in some instances up to 550, in other instances up to 500, in some cases up to 450, in other cases up to 400, and in some situations up to 350 µm. The maximum average size of the pre-expanded resin beads will be limited by the dimensions of the two-part mold to allow for feeding of the expandable and/or pre-expanded resin beads into the mold as described herein. The pre-expanded resin beads can be screened to remove beads that are too large. The pre-expanded resin beads used in this embodiment can be any value or can range between any of the values recited above.

The present invention provides a device for producing labeled expanded resin containers that can be used according to the above-described method. The present device includes
- a frame made up of a first leg and a second leg attached by one or more first braces, a third leg attached to the second leg by one or more second braces, a fourth leg attached to the third leg by one or more third braces and attached to the first leg by one or more fourth braces;
- at least one mold cavity rail attached to a second brace and a fourth brace;
- at least one mandrel rail attached to a first brace and a third brace and oriented perpendicular to the mold cavity rail;
- a female mold cavity car adapted to move along at least one mold cavity rail between a removed position, a transfer position, and a molding position and including at least one female portion of a two-part mold oriented parallel to the mold cavity rail;
- a male mold cavity car adapted to move along at least one mold cavity rail between an extended position, a releasing position and a molding position and including at least one male portion of the two-part mold oriented parallel to the mold cavity rail, where the female portion and male portion form a mold cavity when the female and male mold cavity cars are in their respective molding positions; and
- a mandrel car adapted to move along at least one mandrel rail between a readying position and an insertion position and including at least one mandrel adapted to seat within the female portion when the mandrel car is in the insertion portion and the female portion is in the transfer position, the mandrel car including one or more cup removers adapted to pull a vacuum and be oriented directly opposed to a male portion when the mandrel car is in the insertion position and the male cavity car is in the releasing position.

The female portion and male portion are typically made of metals and/or metal alloys that are good thermal conducting materials. As such, they can contain, in alloy or in clad layers, materials selected from, without limitation, copper, iron, silver, aluminum, tungsten, manganese, nickel, bronze, chromium, manganin, constantan, nichrome, and combinations thereof. Additionally, it can be desirable to include a layer, which can encompass the inner wall of the female portion with a hard metal or alloy. The hard material provides a surface that can be cleaned without damaging the surface of the inner wall of the female portion. Damage to the inner wall can cause containers to stick to the female portion during molding leading to undesirable unscheduled machine downtime. The hard material can be selected, without limitation, from stainless steel, molybdenum, tungsten, tantalum, niobium, vanadium, and combinations and alloys thereof.

In embodiments of the invention and in order to provide label sheets for use in the invention, the present device includes one or more or a plurality of label sheet magazines and an equivalent number of suction plates adapted to transfer label sheets from a magazine to a mandrel. As such, the present device includes one or more magazines, adapted to hold a plurality of label sheets, attached to the frame and adapted to move between a loading position and a feeding position; and one or more suction plates attached to an arm, the arms being attached to the frame, the arms being adapted to move between a pick up position, where the suction plates are in close proximity to a top label in the magazines, and a feeding position, where the suction plates are in close proximity to the mandrel when the mandrel car is in the readying position.

The present device can also include positioning fingers attached to the suction plate arm. The positioning fingers are adapted to wrap a label sheet around a mandrel.

Figure 9:
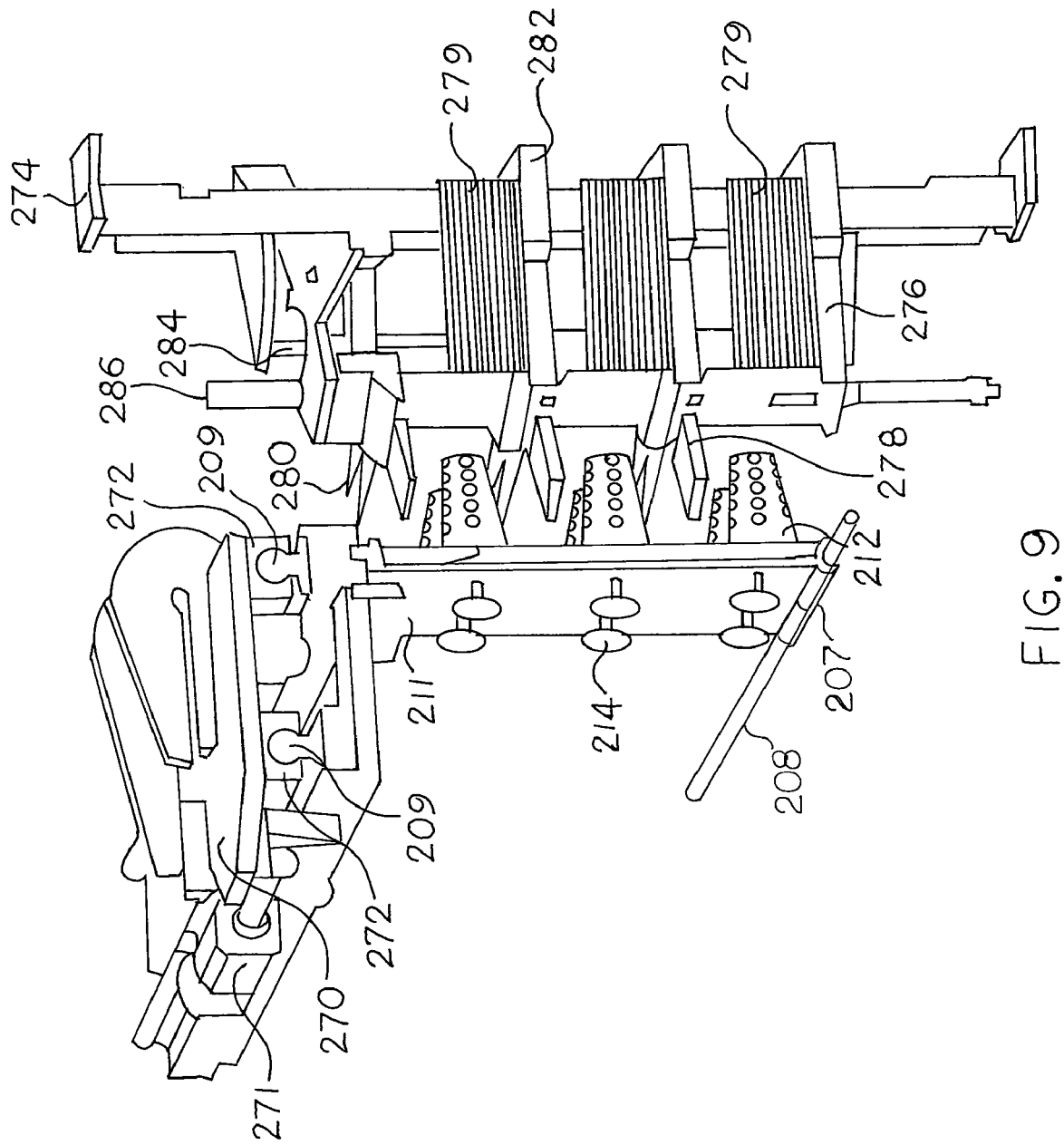
FIG. 9 is a perspective view of a mandrel car and labeling arm, part of a device for making labeled containers according to the invention.

The device according to the invention can include any number of corresponding male portions and female portions of two-part molds and a corresponding number of mandrels and removers, collectively referred to as "cavity parts." Not meaning to limit the scope of the invention in any way, the device according to the invention can have one cavity part, two cavity parts and so on up to, in some cases 24 cavity parts depending on the desired throughput of the device. In an embodiment of the invention, the device can have from 1 to 24, in some cases from 1 to 12, in other cases from 1 to 10, in some situations from 2 to 10, in other situations from 2 to 8, and in some instance from 4 to 8 cavity parts. The following embodiment of the invention for illustration purposes describes, without limitation, a device for making labeled containers according to the invention that has six cavity parts (FIGS. 9-18). In this embodiment of the invention as shown in FIG. 9, mandrel rails 209 are located above mandrel car 211. Optionally, one or more supplemental mandrel rails 208 can be positioned adjacent the bottom of mandrel car 211 to increase the stability of mandrel car 211. Mandrel car 211 includes six mandrels 212 extending from a first side of mandrel car 211 and six removers 214 extending from a second side of mandrel car 211. Mandrel car 211 includes a movement housing 270 adapted to move along mandrel rails 209 and optionally a bottom movement housing 207 adapted to move along supplemental mandrel rail 208. Movement along mandrel rails 208 and 209 can be effected using an appropriate movement means 271, non limiting examples being pneumatic drives, mechanical drives, servo drives, electric motors or by hand. Movement housing 270 can include one or more collars 272 that fit around at least a portion of mandrel rail 209 and/or supplemental mandrel rail 208 (not shown). Alternatively (and not shown), wheels adapted to move along mandrel rails 208 and/or 209 can be used. Mechanical stops can be placed on mandrel rails 208 or 209 to ensure the reproducible location of mandrel car 211 at the readying position and the insertion position. Alternatively, the stops can be achieved by setting the stroke distance on a pneumatic drive or actuator or prescribing the number of turns or angles in a servo drive. In FIG. 9, mandrel car 211 is shown in the readying position.

Also shown in FIG. 9 is labeling arm 274, which includes label magazines 276, suction plates 278, and labeling fingers 280. Label magazines 276 are attached to labeling arm 274 by way of pivoting arms 282. Pivoting arms 282 can move from a feeding position (shown) to a loading position, where the magazines 276 rotate away from mandrel car 211 and suction plate 278. In the loading position, label sheets can be placed in label magazines 276. In the feeding position, labels can be removed using suction plate 278.

Suction plate 278 and labeling fingers 280 are attached to labeling arm 274 by way of support 284 and rotating bar 286, which is adapted to rotate, simultaneously placing suction plate 278 in the feeding position and labeling fingers 280 in a rest position (shown) or by rotating suction plate 278 away from mandrel car 211 such that suction plate 278 is in the pick up position and labeling fingers 280 are in a wrapping position, directly above a mandrel. In the pick up position, suction plate 278 can remove the top label sheet from label sheet stack 279.

Figure 10:
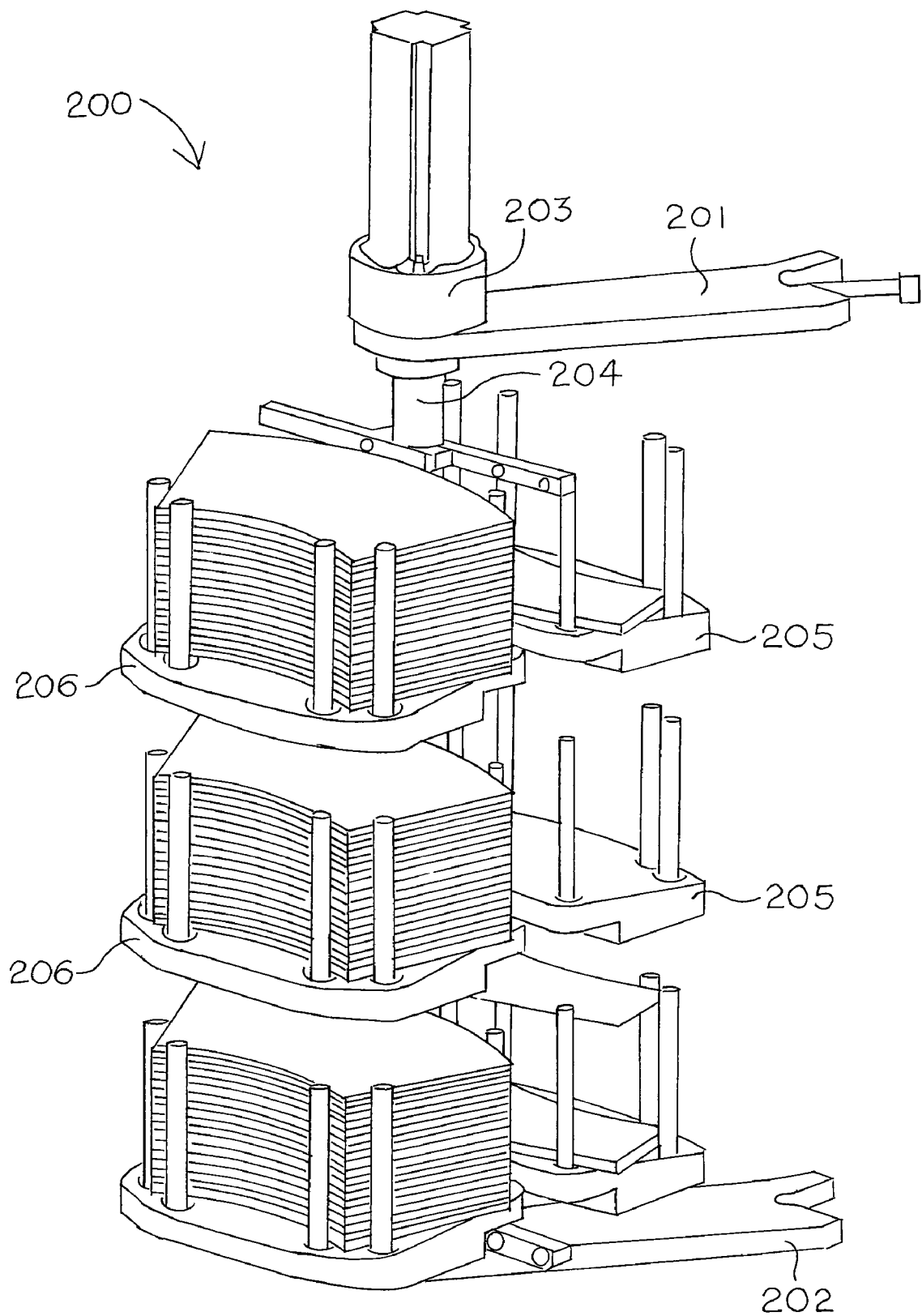
FIG. 10 shows a perspective view of a rotatable label magazine housing according to the invention.

In an embodiment of the invention shown in FIG. 10, rotating magazine housing 200 can be used to provide labels to the machine and process described herein. Rotating magazine housing 200 includes upper support arm 201, lower support arm 202, rotating means 203, rotation shaft 204, first label magazines 205 and second label magazines 206.

Rotating magazine housing 200 can be attached to labeling arm 274 by way of machine screws that are affixed to pre-placed holes in labeling arm 274 and upper support arm 201, lower support arm 202. During operation, labels are removed from first label magazines 205 by suction plate 278 as described herein. While the labels in first label magazines 205 are in a feeding position and are being depleted, a new batch of labels are loaded onto second label magazines 206. When at least one label stack on first label magazines 205 is depleted, either completely or to a prescribed number of labels, rotating means 203 rotates second label magazines 206 about rotation shaft 204 into the feeding position and first label magazines 205 into a loading position.

In an embodiment of the invention, rotating means 203 can be, as non limiting examples, a pneumatic drive, a mechanical drive, a servo drive, an electric motor or can be done using an appropriate handle by hand. Mechanical stops can be placed on rotation shaft 204 or in rotating means 203 to ensure the reproducible location of magazines 205 and 206 at the loading and feeding positions. Alternatively, the stops can be achieved by setting the stroke distance on a pneumatic drive or actuator or prescribing the number of turns or angles in a servo drive.

In another embodiment of the invention, a sensor can be placed on any of magazines 205, 206, or 276 to determine when the stack of labels is too low. The sensor can be set to either trigger a signal (as non-limiting examples a flashing light or audible alarm) and/or to signal rotating means 203 to rotate magazines 205 and 206 about rotation shaft 204.

Figure 11:
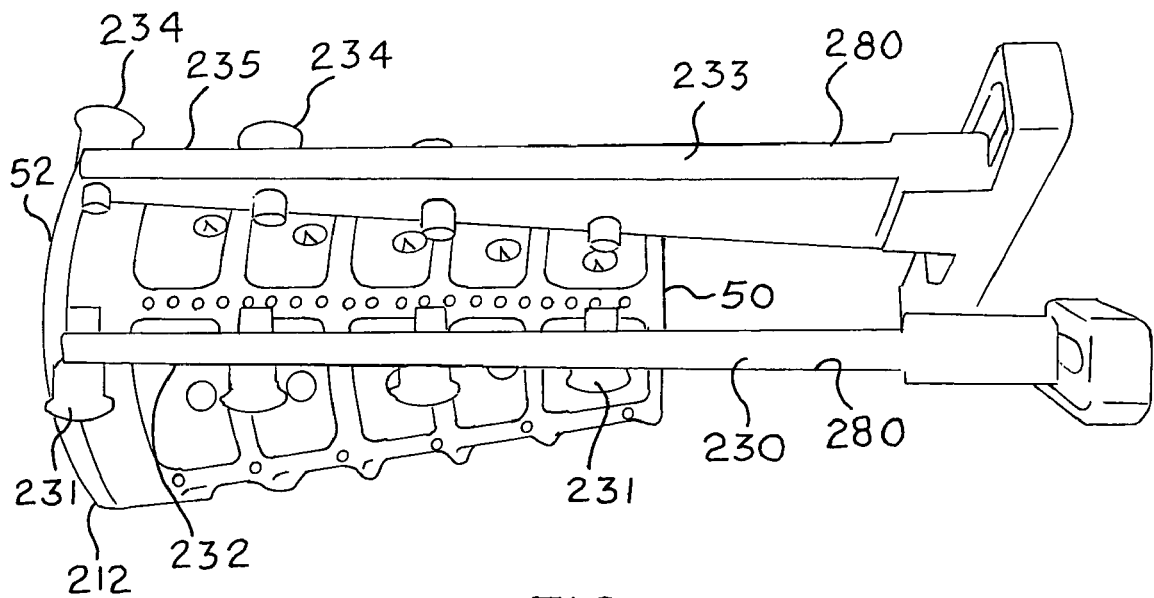
FIG. 11 shows a perspective view of label fingers and a mandrel that can be used in the invention.

Referring to FIG. 11, in embodiments of the invention, labeling fingers 280 are used to position a label onto mandrel 212. Labeling fingers 280 include left labeling finger 230, which includes a plurality of left label placement guides 231 attached along outside surface 232 of left label finger 230. Labeling fingers 280 also include right labeling finger 233, which includes a plurality of right label placement guides 234 attached along outside surface 235 of right label finger 233. During label placement, described in more detail below, label fingers 230 and 233 traverse around the outer edge of mandrel 212. The only portion of label fingers 230 and 233 that contact a label during placement is lapel placement guides 231 and 234, which are aligned with the features of mandrel 212 to ensure desired label placement on mandrel 212.

Figure 12A:
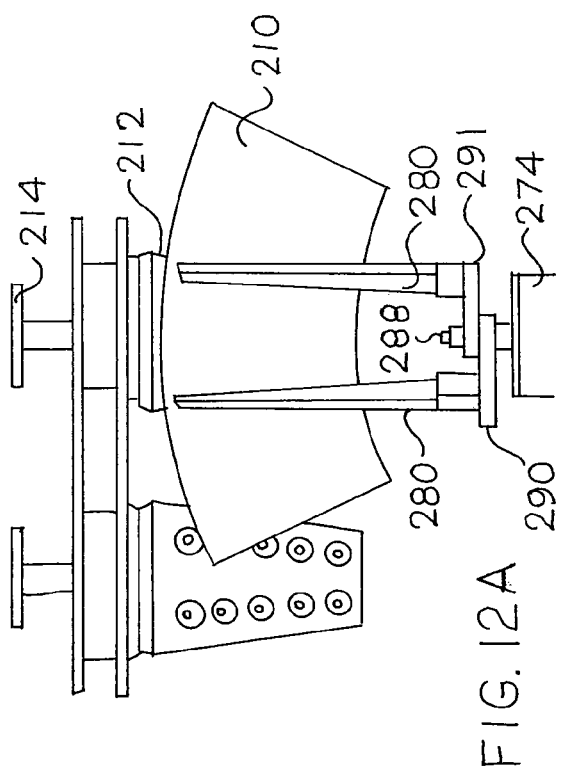
FIGS. 12A-12D show stepwise top plan views of labeling fingers wrapping a label about a mandrel according to the invention.
Figure 12B:
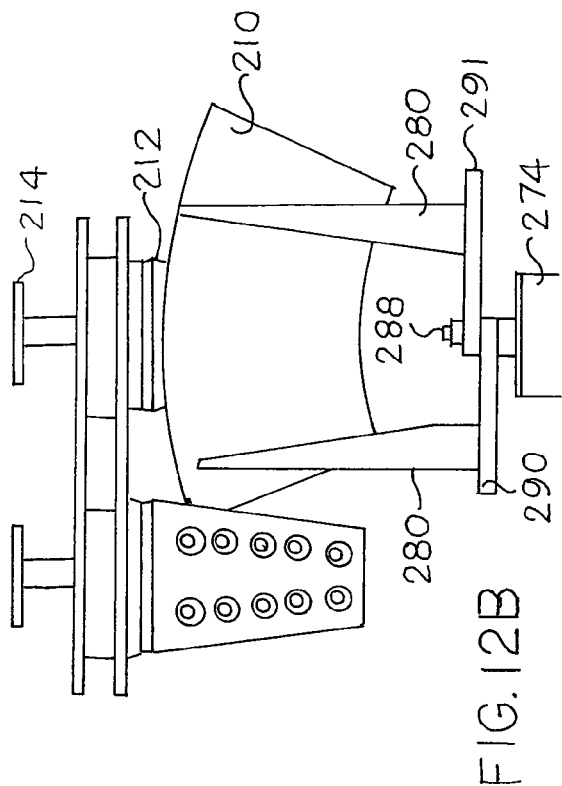
Figure 12C:
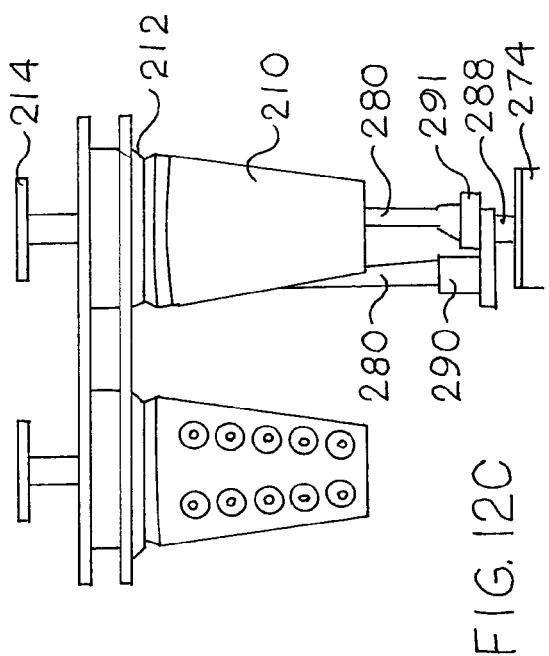
Figure 12D:
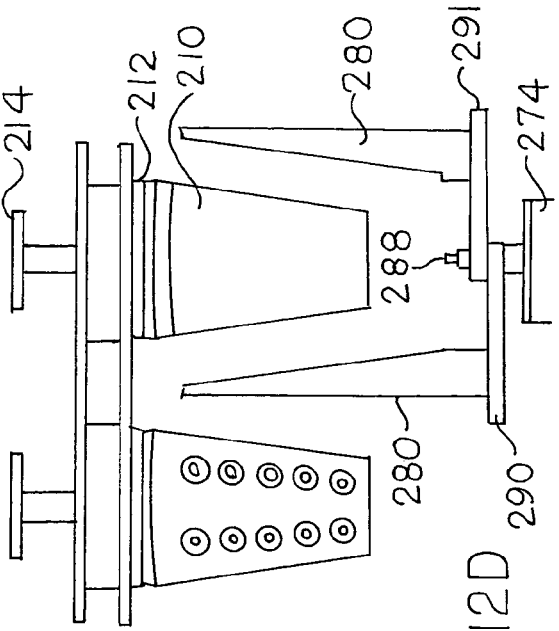

As shown in FIGS. 12A-12D, after suction plate 278 has placed a label sheet 210 on a mandrel 212, labeling fingers 280 are positioned above mandrel 212 (the wrapping position). Labeling fingers 280 are attached to labeling arm 274 by way of rotating arms 290 and 291, attached to rotating mechanism 288, which extends from labeling arm 274. By way of an appropriate motor or other mechanism, rotating arms 290 and 291 move labeling fingers 280 in opposite directions along label sheet 210, starting above mandrel 212 (FIG. 12A), across the upper face of mandrel 212 (FIG. 12B), and along the outline of mandrel 212 until they reach the lower face of mandrel 212 (FIG. 12C). Labeling arms 290 and 291 then return labeling fingers 280 to the starting position (FIG. 12D) and mandrel 212 has a label sheet 210 attached thereto by way of vacuum as described above.

Figure 13:
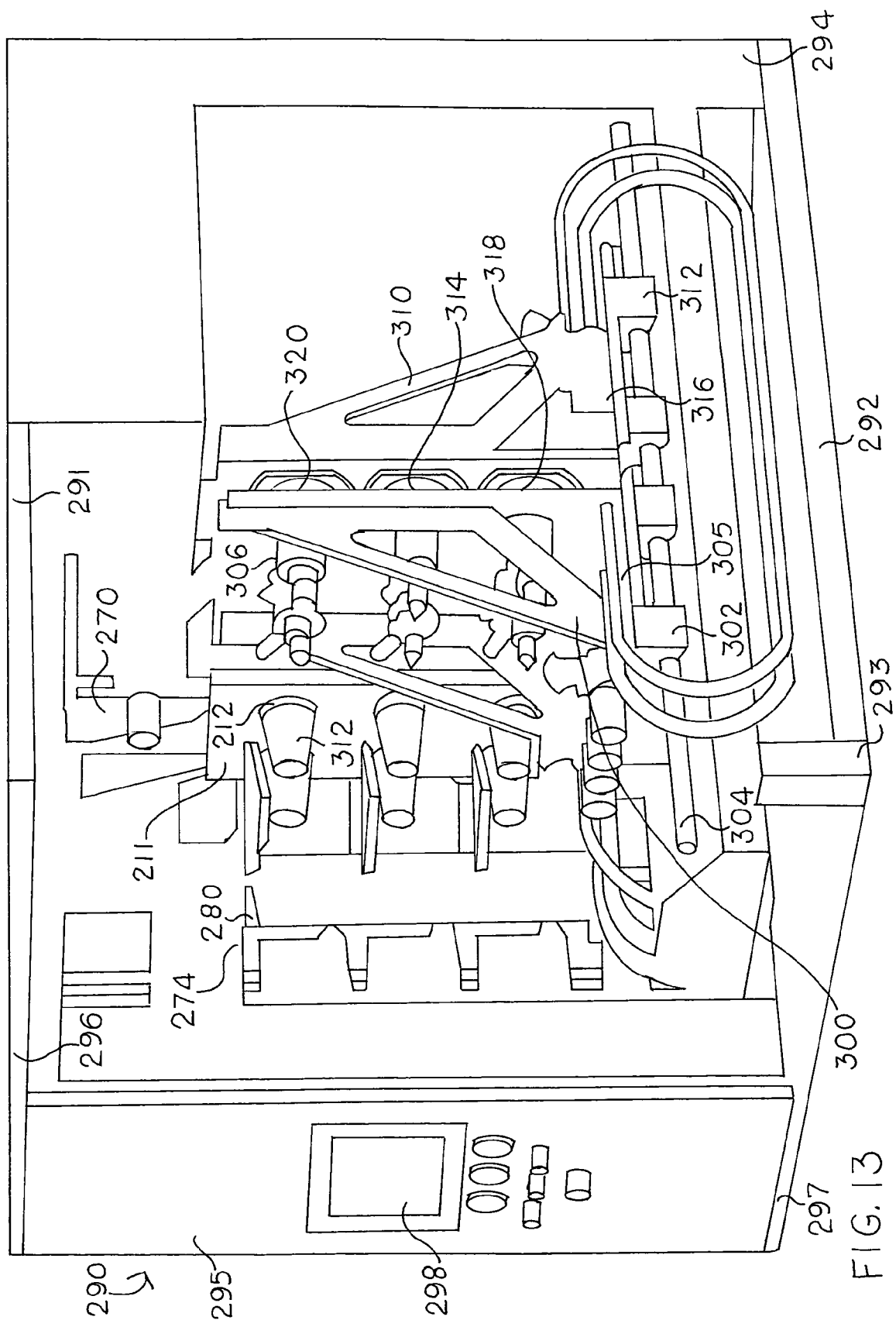
FIG. 13 is a perspective view of a device for making labeled containers according to the invention.

FIG. 13 shows device 290, which includes a frame made up of first leg 293 (partially cut away in this view in order to more completely show device 290) and second leg 294 attached by top first brace 291 and bottom first brace 292, a third leg (obscured in this view) attached to second leg 294 by top and bottom second braces (obscured), fourth leg 295 attached to third leg by top and bottom third braces (obscured) and attached to first leg 293 by top fourth brace 296 and bottom fourth brace 297. Control panel 298 can be used to monitor and program microprocessors and/or a control computer that interfaces with sensors, actuators, drives, servos, resolvers, relays, motors, and feedback loops in device 290.

Mandrel rails 209 are attached to top first brace 291 and the top third brace and oriented perpendicular to mold cavity rails 304, which are attached to the bottom second brace and fourth bottom brace 297. Labeling arm 274 is attached to top fourth brace 296 and bottom top brace 297.

Device 290 is adapted for making labeled containers according to the invention and is shown in FIG. 13 with mandrel car 211 in the readying position. Mandrel car 211 is attached to mandrel rails 209 by way of movement housing 270 as described above. Mandrels 212, as described above, are shown with labels attached as described above.

A female mold cavity car 300, containing six female portions 306 of two-part molds 314, as described above, which rests on female movement housing 305 adapted to move along mold cavity rails 304. Movement of female mold cavity car 300 along mold cavity rails 304 can be effected using electric motors, pneumatic drives, mechanical drives, servo drives, or by hand. Female movement housing 305 can include one or more collars 302 that fit around at least a portion of mold cavity rails 304. Alternatively (and not shown), wheels adapted to move along mold cavity rails 304 can be used. Mechanical stops can be placed on mold cavity rails 304 to ensure the reproducible location of female mold cavity car 300 at the molding position and the removed position. Temporary or removable stops can be used for the transfer position. Alternatively, the stops can be achieved by setting the stroke distance on a pneumatic drive or actuator, or by prescribing the number of turns and/or angles on a servo drive. In FIG. 13, female mold cavity car 300 is shown in the molding position.

In an embodiment of the invention, the transfer position and molding position of the female mold cavity car can be the same location.

Figure 14:
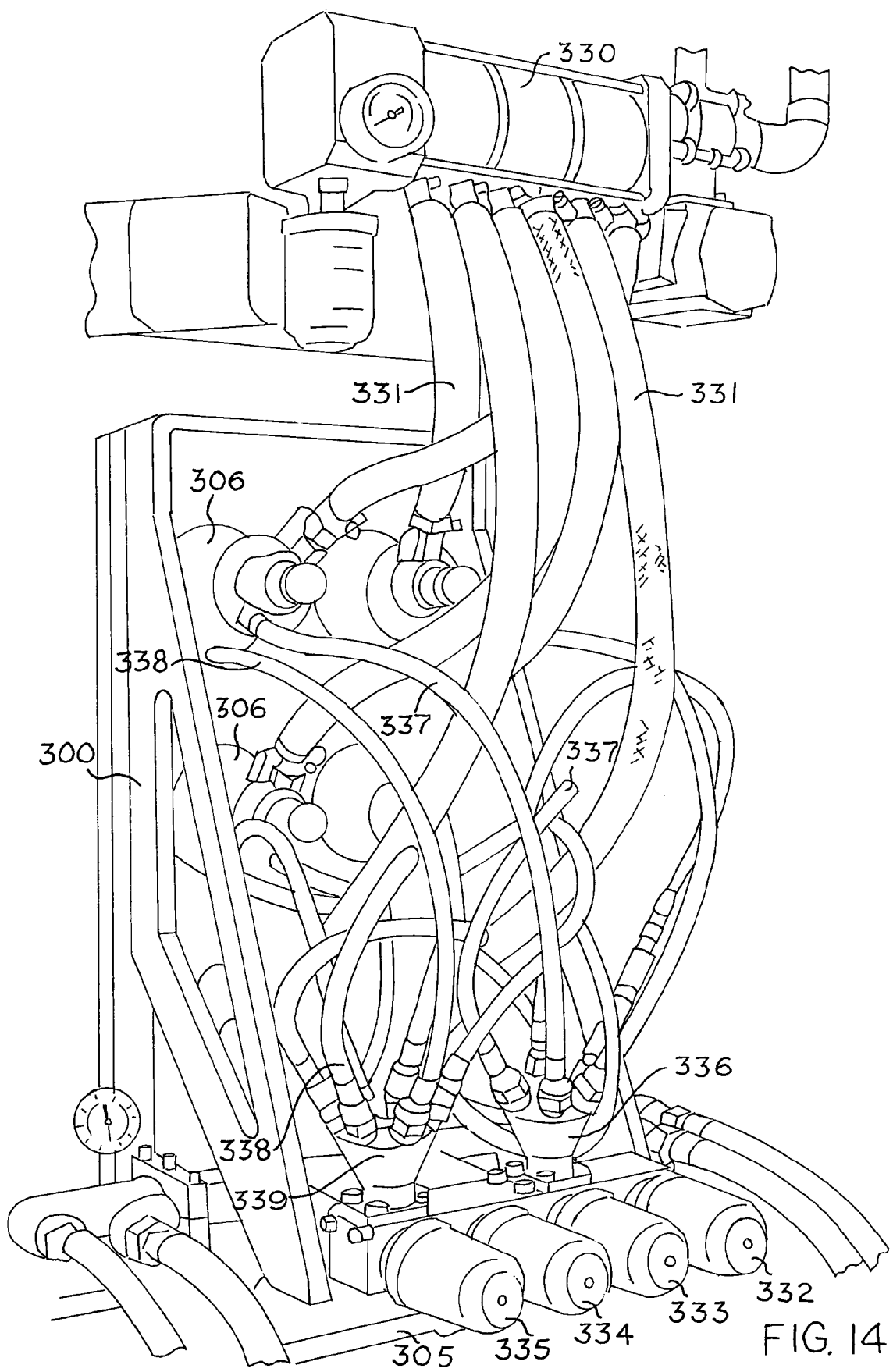
FIG. 14 shows a rear perspective view of a female mold cavity car that can be used in the invention.

Referring to FIG. 14, on the non-molding side of female mold cavity car 300, expandable resin beads or pre-expanded resin beads for use in the molding process described herein are fed to bead hopper 330, from which the expandable resin beads or pre-expanded resin beads are fed to the six female portions 306 of two-part molds 314 via bead lines 331. Vacuum can be applied from the molds 314 to aid in drawing the beads into two-part molds 314 and/or pressure can be applied from bead hopper 330 to assist in the flow of resin beads into two-part molds 314. As a non-limiting example, bead lines 331 can be connected to funnel shaped port 180 (see FIG. 8).

Referring again to FIG. 14, steam and water are provided to female portions 306 of two-part molds 314 by way of steam inlet 332 and water inlet 333 and removed via steam outlet 334 and water outlet 335. When steam or water are required in female portions 306 during the present molding process, steam inlet 332 and/or water inlet 333 are opened and steam and/or water travels to female inlet manifold 336 and is subsequently distributed to each of the female portions 306 of two-part molds 314 by way of female inlet lines 337, which as a non-limiting example can be connected to port 175 in female portion 154 as shown in FIG. 8. Steam and/or water is removed from the female portions 306 of two-part molds 314 by way of female outlet lines 338, which can be connected as a non-limiting example to annular manifold 177 in female portion 154 as shown in FIG. 8. Steam and/or water travels along female outlet lines 338 to female outlet manifold 339, where the outgoing steam and/or water are removed via steam outlet 334 or water outlet 335.

A male mold cavity car 310, containing six male portions 320 of two-part molds 314, which are inserted in female portions, rest on male movement housing 316 adapted to move along mold cavity rails 304. Movement of male mold cavity car 310 along mold cavity rails 304 can be effected using electric motors, pneumatic drives, mechanical drives, servo drives, or by hand. Male movement housing 316 can include one or more collars 312 that fit around at least a portion of mold cavity rails 304. Alternatively (and not shown), wheels adapted to move along mold cavity rails 304 can be used. Permanent mechanical stops can be placed on mold cavity rails 304 to ensure the reproducible location of Male mold cavity car 310 at the molding position and the extended position. Temporary or removable stops can be used for the releasing position. Alternatively, the stops can be achieved by setting the stroke distance on a pneumatic drive or actuator or by prescribing the number of turns and/or angles on a servo drive. In FIG. 13, Male mold cavity car 300 is shown in the molding position.

Figure 15:
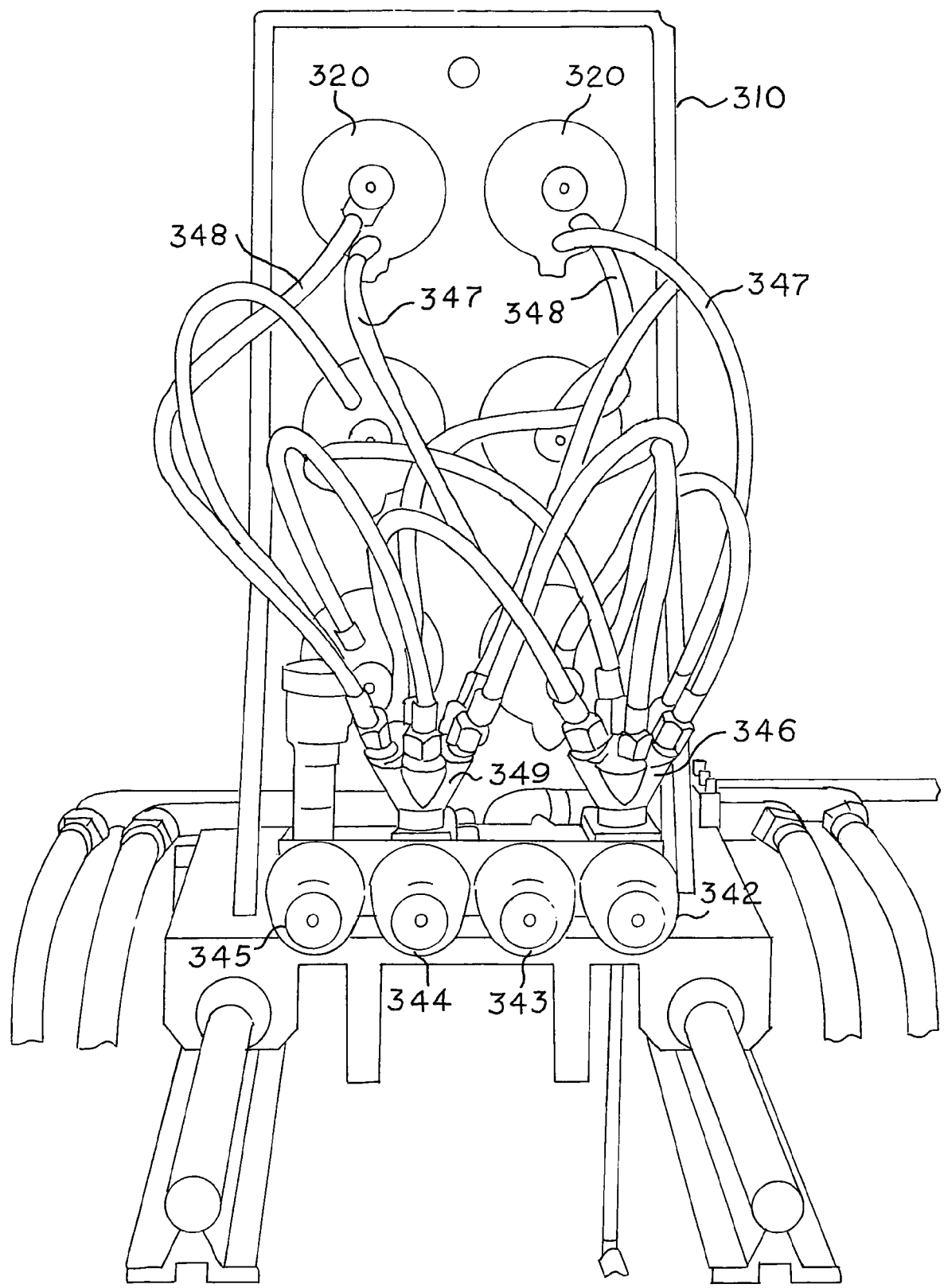
FIG. 15 shows a rear perspective view of a male mold cavity car that can be used in the invention.

Referring to FIG. 15, steam and water are provided to male portions 320 of two-part molds 314 by way of steam inlet 342 and water inlet 343 and removed via steam outlet 344 and water outlet 345. When steam or water are required in male portions 320 during the present molding process, steam inlet 342 and/or water inlet 343 are opened and steam and/or water travels to male inlet manifold 346 and is subsequently distributed to each of the male portions 320 of two-part molds 314 by way of male inlet lines 347, which as a non-limiting example can be connected to pipe 155 in male portion 152 as shown in FIG. 8. Steam and/or water exiting male portions 320 is removed from the male portions 320 of two-part molds 314 by way of male outlet lines 348, which can be connected as a non-limiting example to annular outlet 156 in male portion 152 as shown in FIG. 8. Steam and/or water travels along male outlet lines 348 to male outlet manifold 349, where the outgoing steam and/or water are removed via steam outlet 344 or water outlet 345.

While the mandrel car 211, female mold cavity car 300 and male mold cavity car 310 are in the positions shown in FIG. 13, labeled containers are molded as described above and label sheets 210 are applied to mandrels 212 as described above. During the molding cycle, a suitable locking mechanism can be engaged to ensure that two-part molds 314 are properly closed. The steps can be performed at the same time and in approximately the same length of time. Thus, the molding operation, including the steps of feeding resin beads to the mold cavities, preheating, cooking, and cooling, can be completed in at least 10, in some cases at least 12 and in other cases at least 15 seconds and can take up to 120, in some cases up to 100 and in other cases up to 90 seconds to complete. The molding operation can be completed in a time frame indicated above or can be completed in a time frame varying between any of those indicated above. The labeling operation steps including extracting label sheets, placing the label sheets on the mandrels, and wrapping the label sheets around the mandrels using labeling fingers as described above, can be completed in at least 20, in some cases at least 30 and in other cases at least 40 seconds and can take up to 120, in some cases up to 100 and in other cases up to 90 seconds to complete.

Figure 16:
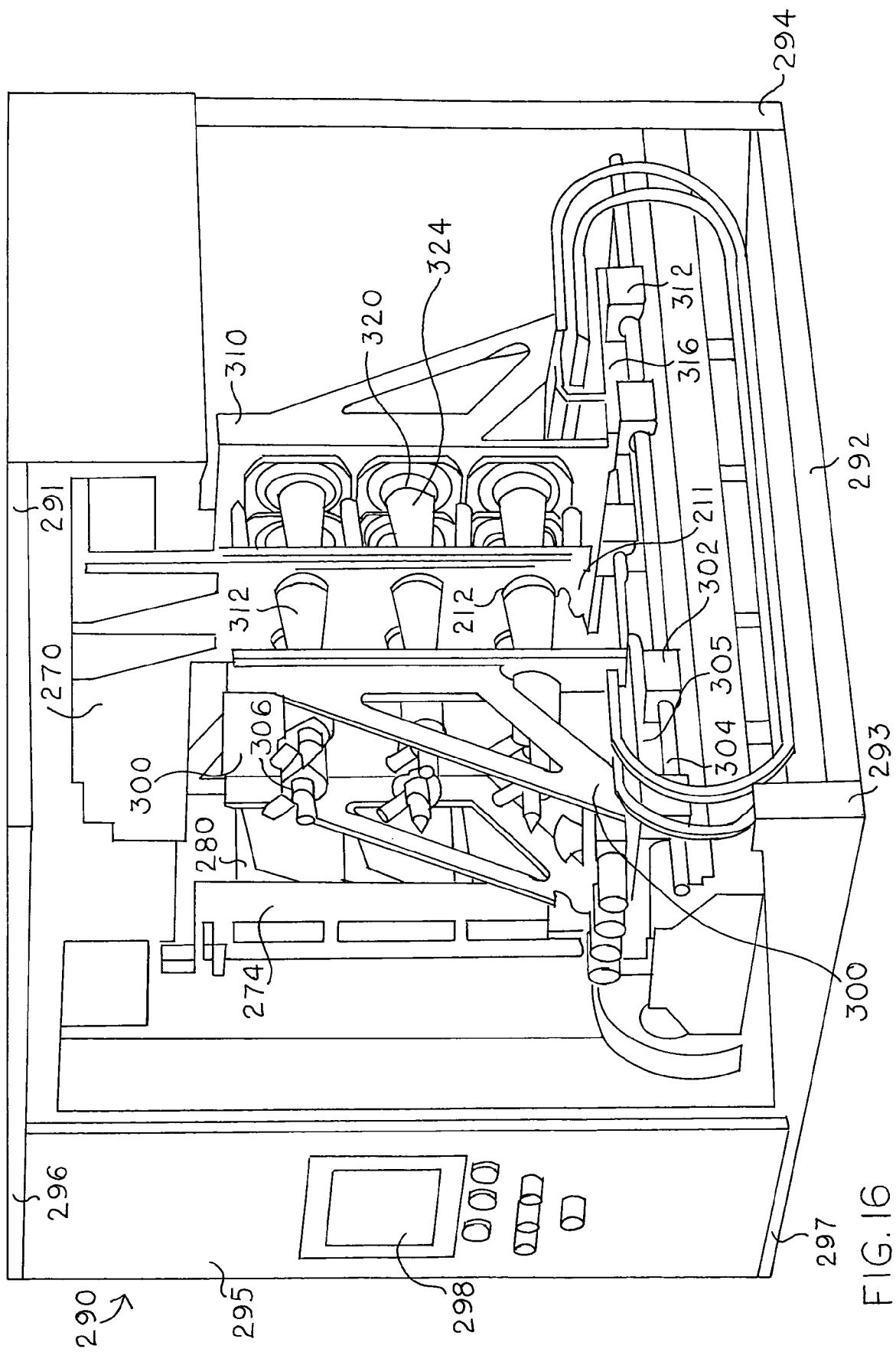
FIG. 16 is a perspective view of a device for making labeled containers according to the invention.

FIG. 16 shows device 290 with female mold cavity car 300 in the removed position and male mold cavity car 310 in the releasing position. As shown labeled containers 324 are attached to male portion 320. Mandrel car 211 is in the insertion position with label sheets attached to mandrels 312. While in this position, the removers (obscured in this view), apply vacuum to draw labeled containers 324 from male portion 320 to the removers. When the mandrel car and male mold cavity car are in position, the labeled containers can be transferred from the male portions to the remover in 1 to 10 seconds, in some cases from 2 to 8 seconds and in other cases from 3 to 6 seconds.

Figure 17:
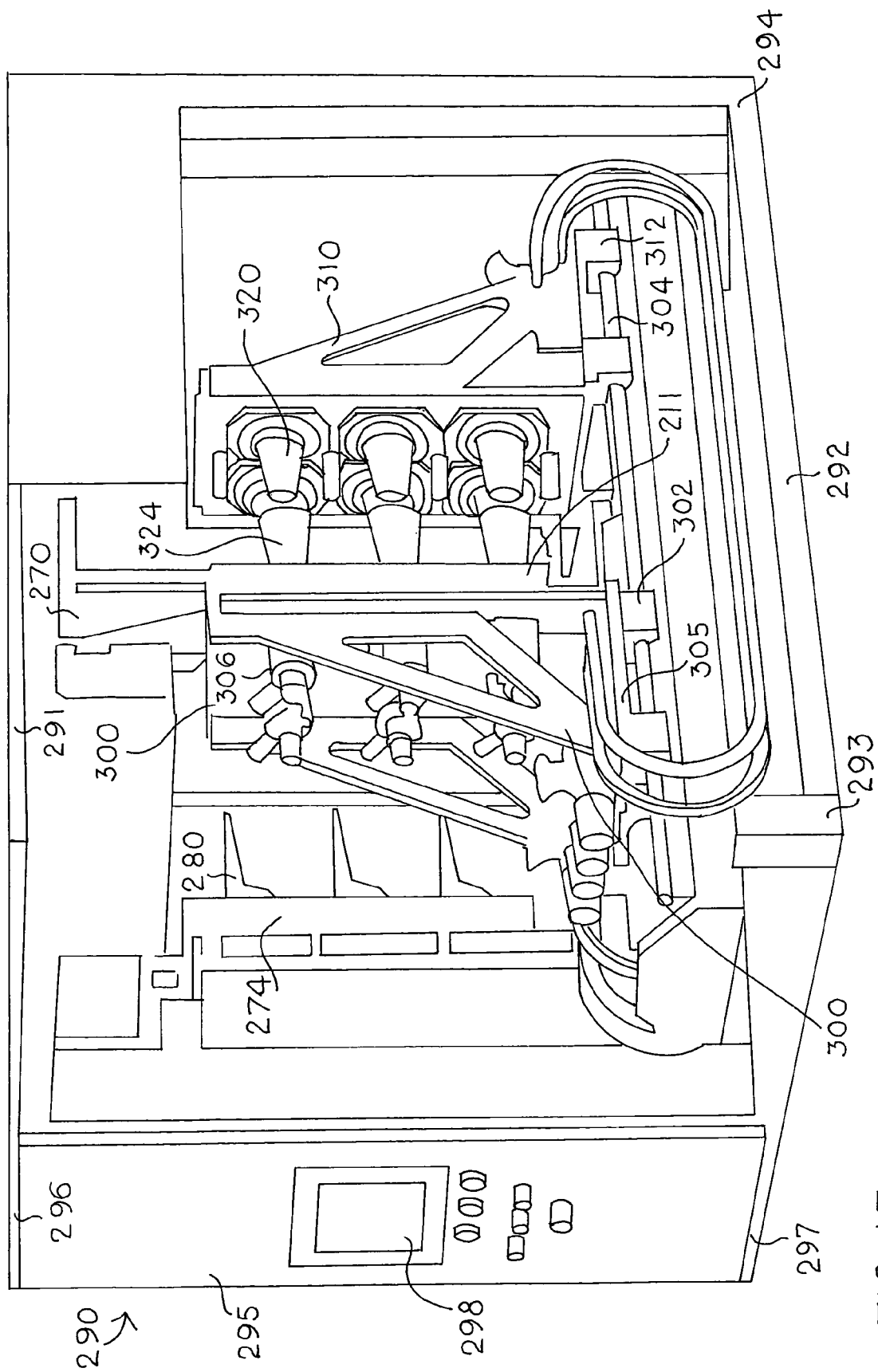
FIG. 17 is a perspective view of a device for making labeled containers according to the invention.

FIG. 17 shows device 290 with female mold cavity car 300 in the transfer position and male mold cavity car 310 in the extended position. As shown labeled containers 324 are attached to removers (obscured in this view). Mandrel car 211 is in the insertion position. One or more sensors can be placed on male mold cavity car 310 to check that the previously molded container has been removed from female portions 314 prior to moving mandrel car 211 into the insertion position. If the previous container has not been removed, the sensor can stop device 290 and trigger an appropriate signal (as non-limiting examples a flashing light or audible alarm) to alert an operator and/or control device of the malfunction. In this position scenario, the label sheets are positioned in female portions 314 as described above. When the mandrel is inserted in the female portion, the label sheet can be transferred from the mandrel to the inner wall of the female portion. Transfer of the label sheet can be accomplished in 1 to 10 seconds, in some cases from 2 to 8 seconds and in other cases from 3 to 6 seconds.

Figure 18:
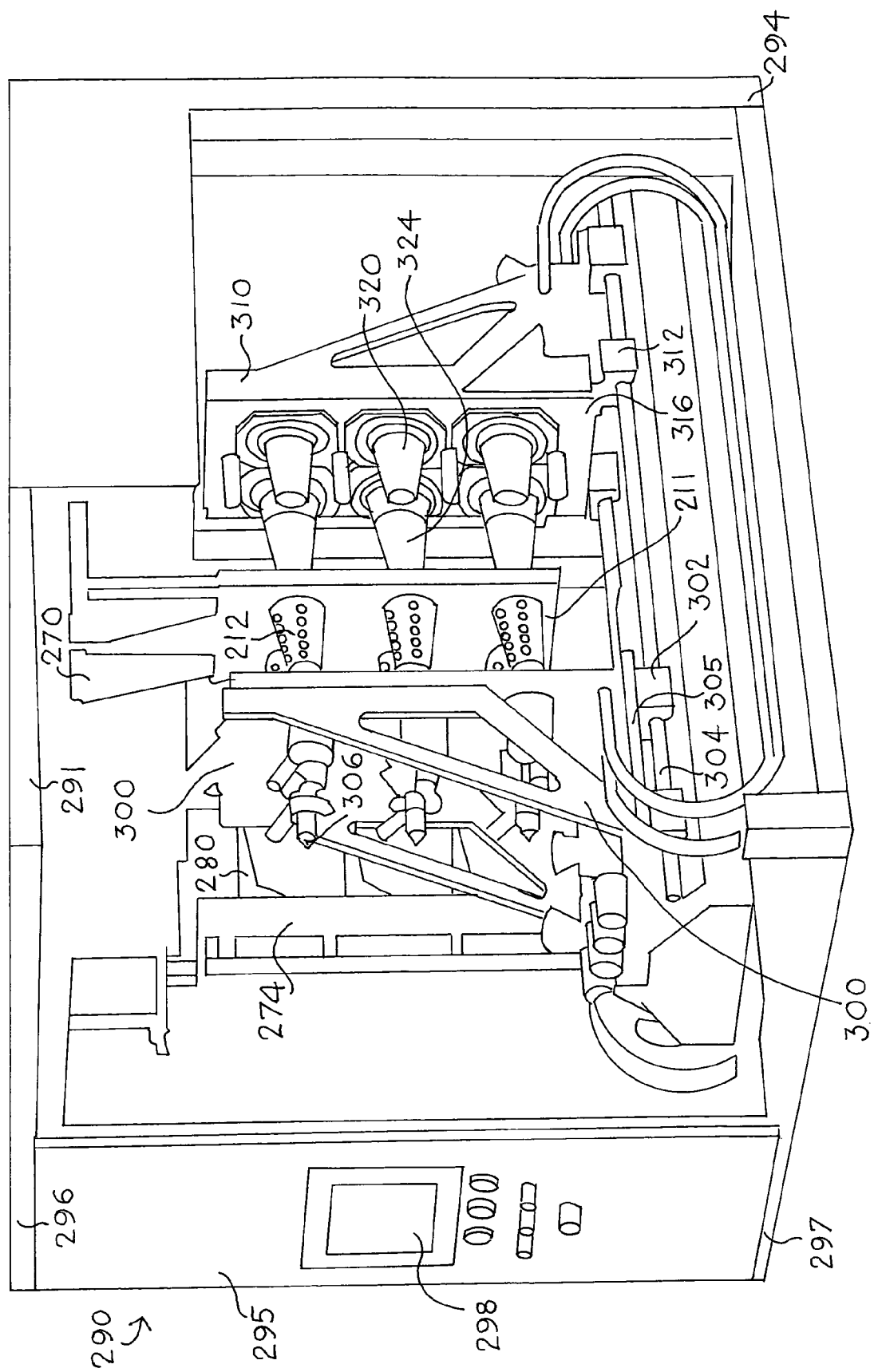
FIG. 18 is a perspective view of a device for making labeled containers according to the invention.

FIG. 18 shows device 290 with female mold cavity car 300 in the removed position and male mold cavity car 310 in the extended position. As shown labeled containers 324 are attached to removers (obscured in this view). Mandrel car 211 is in the insertion position. In this position scenario, the label sheets have been positioned in female portions 306 and female mold cavity car 300 has backed away from mandrels 212, which are no longer in contact with female portions 306 and are free of label sheets.

From the positions shown in FIG. 18, the cars travel back to the positions shown in FIG. 13. Once mandrel car 211 returns to the readying position, the vacuum to the removers is discontinued and compressed air can optionally be applied to allow the labeled containers 324 to fall away or otherwise be removed from the removers to be further processed and packaged. Subsequently, the molding cycle can take place in the two-part molds 318 and labels can be placed on the mandrels 212 as described above. Thus, the present device continuously produces labeled containers according to the invention.

Any suitable pneumatic drive, servo drive, or actuator can be used in the present invention. Suitable pneumatic drives include, without limitation, single-acting, single acting with spring return, and double acting pneumatic cylinders. Suitable servo drives that can be used in the invention include, without limitation, those available from include, Bosch Rexroth Corp., Hoffman Estates, Ill., and GE Fanuc Automation, Inc., Charlottesville, Va., which can include without limitation associated motors, amplifiers, power supplies, feedback units, and brakes. Suitable pneumatic drives or servo driven actuators that can be used in the invention include those available from Norgren Inc., Littleton, Colo.; Universal Fluid Power Pty Ltd., Moorooka, Queensland, Australia; SP Air Limited, Manchester, United Kingdom, Bosch RexRoth Corp., Bethlehem, Pa., Siemens AG, Munich, Germany, SMC Corp., Indianapolis, Ind., and Festo USA, Hauppauge, N.Y.

The device according to the invention can be used in a method of making the present labeled containers. The method includes:

applying a label sheet to an inner wall of each of one or more female portions of the two-part mold by
positioning one or more mandrels, that hold a label sheet using vacuum applied through the suction holes, in one or more female portions; and
releasing the label sheet in the female portion by stopping the vacuum and applying an electrostatic charge to the label sheet via the charging pins in the mandrel and optionally applying a "puff" of compressed air from the suction holes in the mandrel;
positioning one or more male portions of the two-part mold in contact with the corresponding female portions to form one or more mold cavities;
adding expandable resin beads or pre-expanded resin beads to the mold cavities;
applying a sufficient amount of heat for a sufficient length of time to the mold cavities to effect expansion of the expandable resin beads or pre-expanded resin beads to form labeled containers;
cooling the labeled containers; and
removing the labeled containers from the mold cavities.

In an embodiment of this method, the step of applying a label sheet to an inner wall of each of one or more female portions of the two-part mold can be performed by:

extracting a label sheet from a magazine containing label sheets stacked in a parallel relationship to the rails, the magazine being attached to the frame and adapted to rotate between a loading position and a feeding position, the labels being extracted from the magazine by way of a suction plate attached to an arm, which is attached to the frame and movable between a pick up position and an application position, wherein the suction plate is adapted to contact a surface of a top label in the magazine and is adapted to extract and hold the top label through the application of vacuum;
moving the suction plate with label held thereto from the pick up position to the application position,
positioning the label sheet directly above a mandrel in the readying position, wherein the mandrel in the readying position is aligned with the application position of the suction plate and the mandrel in the insertion position is aligned in a position horizontally opposed to the female portions;
transferring a label sheet, as described above from the suction plate to the mandrel by applying a vacuum through the mandrel and discontinuing the vacuum applied to the suction plate;
moving the mandrel car and mandrels with a label sheet attached thereto from the readying position to the insertion position, the female portions being in the removed position;
moving the female portions from the removed position to the transfer position and positioning the label sheets adjacent to the inner wall of the female portions at a predetermined location;
discontinuing the vacuum to the mandrel;

applying an electrostatic charge to the label sheets by generating a sufficient voltage to the electrostatic pins to provide an electrostatic attractive force between the label sheets and the inner wall surface of the female portion, optionally applying a "puff" of compressed air from the mandrel to effect movement of the label from the mandrel to the inner wall surface of the female portion, moving the female portions from the transfer position to the removed position; and moving the mandrel from the insertion position to the readying position.

In a further embodiment of the invention, the label material is capable of maintaining a surface electrostatic charge as described above. In a particular aspect of this embodiment, the surface resistivity of the label material is greater than $10^{10}$ $\Omega$/sq.

Another embodiment of the invention includes wrapping the label sheet around the mandrel using positioning fingers attached to the suction plate arm after transferring the label sheet from the suction plate to the mandrel.

In a particular embodiment of the present method, the mandrel is free floating when positioned in a female portion as described above.

In many embodiments of the invention, the male portions are horizontally positioned in the female portions of the two-part mold to form mold cavities by moving the female portions from the removed position to the molding position; and moving the male portions from the extended position to the molding position.

In the present method, the female and male portions of the two-part mold are adapted such that when the female portions are in the removed position the male and female portions are spaced apart and not in contact with each other and such that when the male portions are in the releasing position or extended position, the male portions are spaced apart and not in contact with the female portions.

In an embodiment of the invention, the expandable resin beads or pre-expanded resin beads are added to the mold cavity by way of one or more feed channels in the female portion, where a valve is positioned at an end of the feed channels adapted to close and seal the feed channel from the mold cavities during expansion and fusion of the resin beads.

In another embodiment of the invention, the heat applied to the mold cavity can be independently controlled in the male portion and female portion. Thus, the applying heat step can include applying a heat cycle in the female portion that is independent from applying a heat cycle in the male portion.

In certain aspects of this embodiment, the method can include preheating the mold cavities by flushing steam cavities adjacent the outside of the mold cavities within the female portions with steam. This step can be followed by applying steam to the mold cavity from the male portion after preheating.

In other aspects of this embodiment, the method can include preheating the mold cavities by flushing steam cavities adjacent the outside of the mold cavities within the male portions with steam. This step can be followed by applying steam to the mold cavity from the male portion after preheating.

In additional aspects of this embodiment, the method can include preheating the mold cavities by flushing steam cavities adjacent the outside of the mold cavities within the male portions with steam and flushing steam cavities adjacent the outside of the mold cavities within the female portions with steam. This step can be followed by applying steam to the mold cavity from the male portion after preheating.

In embodiments of the invention, the labeled containers can be removed from the mold cavities after cooling by applying compressed air from the female portions into the mold cavities and/or applying vacuum from the male portion sufficient to cause the labeled container to travel with the male portion;

moving the female portion from the molding position to the removed position;

moving the male portion from the molding position to the releasing position;

moving the mandrel car from the readying position to the insertion position;

applying a vacuum to the cup remover oriented directly opposed to a base of the labeled container sufficient to cause the labeled container to release from the male portion and remain in contact with and travel with the cup remover;

moving the mandrel car to the readying position; and removing the vacuum to the cup remover causing the cup to release and fall away from the cup remover.

In the present method, the time required for completing the steps from applying the label sheet to removing the labeled container can be completed in less than 60, in some cases less than 45 and in other cases less than 30 seconds.

The devices and methods described above provide a labeled expanded resin container that includes:

expandable resin beads or pre-expanded resin beads, as described above, molded in a shape having a sidewall with an outer surface and a base; and a label formed from a label material capable of maintaining an electrostatic charge disposed over at least a portion of the outer surface of the sidewall of the container.

As indicated above, the present container has a label sheet that is laminated to the expanded plastic material and with the external wall of the container during the molding process. A key feature of the present container is that the labeled external wall presents a smooth circumferential surface.

The label includes an electrically insulating substrate, as described above, having a first surface and a second surface; a heat sensitive adhesive, as described above, disposed over at least a portion of the first surface, and optionally a coating and/or printing ink disposed over at least a portion of a surface of the label sheet.

Figure 19:
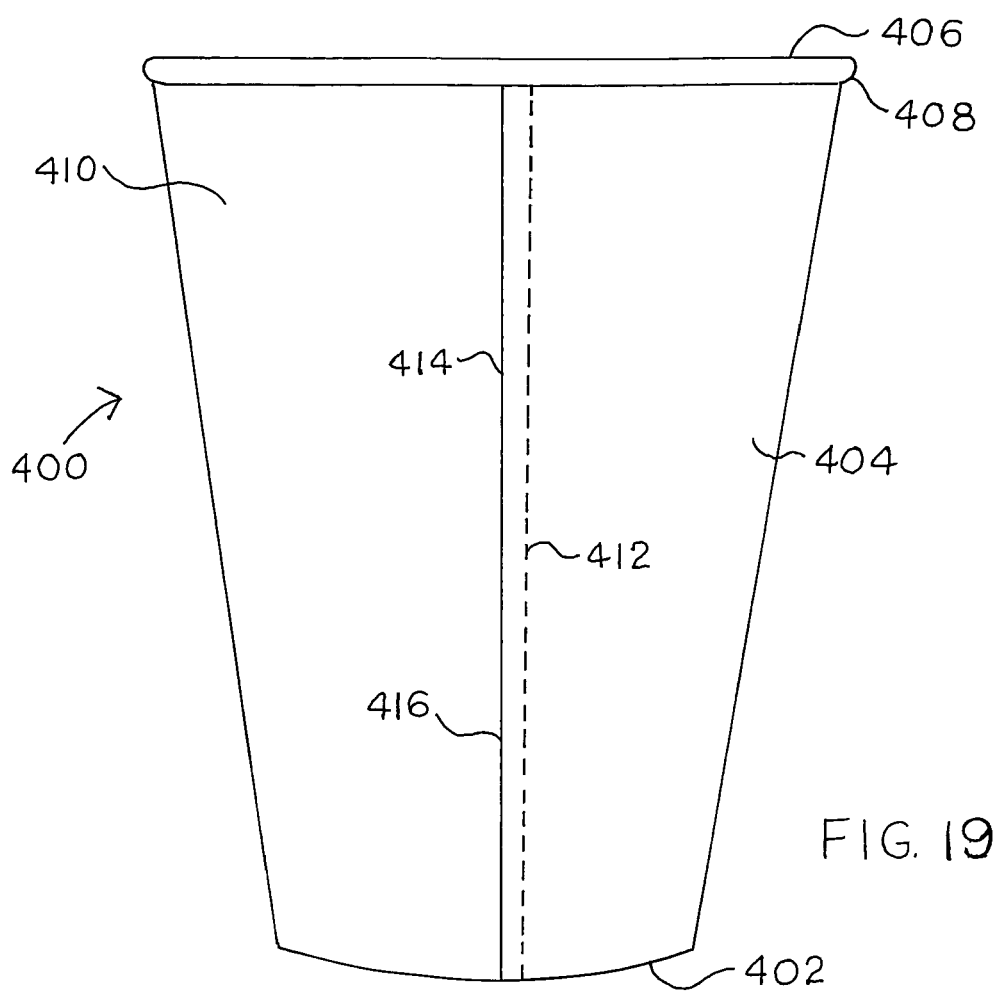
FIG. 19 is an elevation view of a container according to the invention.
Figure 20:
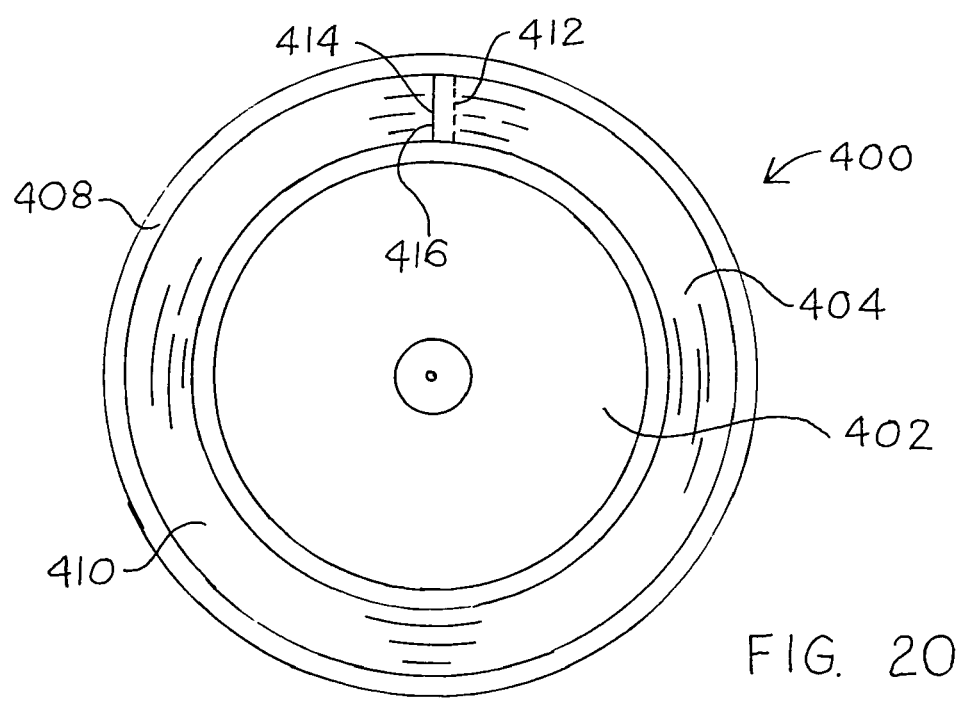
FIG. 20 is a bottom plan view of a container according to the invention.

As shown in FIGS. 19 and 20, the containers 400 according to the invention are circular shape in plan and include base 402 and a side wall 404 extending upwardly and outwardly from base 402 to a mouth 406 at the top of container 400 where side wall 404 terminates in an annular rim 408, which projects radially outwardly from side wall 404 about mouth 406 of container 400. A multiplicity of such containers can be stacked in nested relation and to prevent them from wedging together, when so stacked, making the containers difficult to separate from the stack. The label 410 includes first end 412 and second end 414, which can overlap to form a seam indicated by an edge 416 of second end 414 where they meet along side wall 404. Of note, as indicated above, label 410 presents a smooth circumferential surface, particularly at seam 416.

In an embodiment of the invention, first end 412 overlaps second end 414 to create a seam described above. In this embodiment, a heat sensitive adhesive is only applied to at least a portion of a bottom surface of only the overlap portion of second end 414 such that the heat sensitive adhesive contacts at least a portion of a top surface of the overlap portion of first end 412.

In an embodiment of the invention, the labeled expanded or foam plastic container 400 can be molded from expanded polystyrene material.

In another embodiment of the invention, the labeled expanded or foam plastic container 400 is a thin walled product of high density foam plastic material.

As used herein, the term "thin walled" refers to a container that has a sidewall thickness of at least 0.5, in some cases at least 0.75 and in other cases at least 1 mm and can be up to 5, in some cases up to 4 and in other cases up to 3 mm. The sidewall thickness often depends on the container height and is adjusted accordingly to provide sufficient strength to the container. The thickness of the sidewall of the container can be any value or range between any values recited above.

The labeled containers according to the invention can be cups, used for example to store, dispense and/or drink hot, cold or other beverages, bowls to store or dispense food, such as soups, noodles, instant noodles, vegetables, meats, and oily food products, fried foods, non-limiting examples including fried chicken, french fried potatoes, fried seafood, and the like, pet foods and snacks, potato chips, pretzels, and the like, and other containers or vessels for storing and dispensing food products and other materials.

Although exemplified in FIGS. 19 and 20 as being circular shape in plan, the present contains can have any suitable shape in plan so long as the shape is adaptable to being molded as described herein. As such, the present containers can have a circular, oval, elliptical, square, rectangular, triangular, pentagonal, hexagonal, heptagonal, octagonal, trapezoidal, or parallelogram-like shape in plan.

In other embodiments of the invention, the present containers have improved rim strength when compared to similarly manufactured containers without an in-mold labeled smooth circumferential label surface.

As used herein, "rim strength" is determined using a Chatillon model DFGHS digital force gauge (AMETEK US Gauge Division, CHATILLON Brand Products, Largo, Fla.). The digital force gauge is set up such that the force gauge pushes against one side of a container at a distance of one inch below the rim at a constant speed for a set distance of ¼ inch. The movement is controlled by a servo motor. When ¼ inch is reached the servo stops and the peak force value is recorded. The reported measurement is an average of determinations made on five randomly selected containers.

As a non-limiting example, the present cups can have a rim strength that is at least 50%, in some cases at least 75%, and in other cases at least 90% greater than the rim strength of a container that does not contain a label, where the base containers are made using the same equipment.

Additionally, the present containers having an in-mold labeled smooth circumferential label surface have improved rim strength when compared to similarly manufactured containers that are labeled after-molding by "wrapping a label" around the side wall of the container. As a non-limiting example, the present cups can have a rim strength that is at least 5%, in some cases at least 10%, and in other cases at least 15% greater than the rim strength of an after mold labeled container, where the base containers are made using the same equipment.

In other embodiments of the invention, the rim strength of the present containers is at least 0.3, in some cases at least 0.4 and in other cases at least 0.5 KG.

The rim of the present labeled container can be adapted to accept a lid as is readily known in the art. Further, the labeled container can be shrink wrapped, as is known in the art, to prevent, among other things, the lid from unintentionally being removed from the labeled container.

Thus, the present container can include a rim that is adapted to accept a lid and can include a lid secured to the rim. When shrink wrapping is applied to the container with lid, a secured and/or sealed storage vessel, cup, or bowl is provided.

The present invention will further be described by reference to the following examples. The following examples are merely illustrative of the invention and are not intended to be limiting. Unless otherwise indicated, all percentages are by weight and Portland cement is used unless otherwise specified.

EXAMPLE 1

Polystyrene resin beads (DYLITE® T Beads available from NOVA Chemicals Inc., Pittsburgh, Pa.) having an average particle size of about 400 µm were pre-expanded to a bulk density of 6.25 lb/ft$^3$. 12 oz. foam cups were made using the machine described in FIGS. 9-18. The cups for sample 1 were labeled using the in-mold labeling techniques described herein. The 12 oz. foam cups, or "base cups" for sample 2 were molded using the machine described in FIGS. 9-18 without in-mold labeling and a label was wrapped onto the cups and affixed using Avery Permanent Glue Stic (Avery Dennison Corp., Pasadena, Calif.) as adhesive. The 12 oz. foam cups, or "base cups" for sample 3 were molded using the machine described in FIGS. 9-18 and were not labeled. All of the cups had a wall thickness of 1.8 mm.

Rim strength of five cups from each sample was measured using a Chatillon model DFGHS digital force gauge (AMETEK US Gauge Division, CHATILLON Brand Products, Largo, Fla.). The digital force gauge is set up such that the force gauge pushes against one side of a cup at a distance of one inch below the rim at a constant speed for a set distance of ¼ inch. The movement is controlled by a servo motor. When ¼ inch is reached the servo stops and the peak force value is recorded. The results are shown below.

|  | Sample 1 | Sample 2 | Sample 3 |
|---|---|---|---|
| Description | In-Mold Labeled | After Mold Labeled | Not Labeled |
| Rim Strength (KG) | 0.53 | 0.44 | 0.27 |

The data demonstrate the improved rim strength of containers made using the in-mold labeling molding machine and methods according to the present invention. The rim strength of the present containers was measured as 96% greater than that measured for an unlabeled container and the rim strength of the present containers was measured as 20% greater than that measured for an after-mold labeled or "wrap labeled" container.

The present invention has been described with reference to specific details of particular embodiments thereof. It is not intended that such details be regarded as limitations upon the scope of the invention except insofar as and to the extent that they are included in the accompanying claims.

We claim:

1. A device for producing labeled expanded resin containers comprising:
   at least one mold cavity rail;
   at least one mandrel rail oriented perpendicular to the mold cavity rail;
   a female mold cavity car adapted to move along at least one mold cavity rail between a removed position, a transfer position, and a molding position and including at least one female portion of a two-part mold oriented parallel to the mold cavity rail;

a male mold cavity car adapted to move along at least one mold cavity rail between an extended position, a releasing position and a molding position and including at least one male portion of the two-part mold, wherein the female portion and male portion form a mold cavity when the female and male mold cavity cars are in their respective molding positions; and a mandrel car adapted to move along at least one mandrel rail between a readying position and an insertion position and including at least one mandrel adapted to seat within the female portion when the mandrel car is in the insertion position and the female car is in the transfer position, the mandrel car including one or more cup removers adapted to pull a vacuum and be oriented directly opposed to a male portion when the mandrel car is in the insertion position and the male cavity car is in the releasing position;

wherein the two part mold comprises at least one conduit adapted to supply preexpanded resin beads to the mold cavity and at least one conduit for supplying steam to the mold cavity.

2. The device according to claim 1 further comprising a frame comprising a first leg and a second leg attached by one or more first braces, a third leg attached to the second leg by one or more second braces, a fourth leg attached to the third leg by one or more third braces and attached to the first leg by one or more fourth braces; wherein the at least one mold cavity rail is attached to the second brace and fourth brace and the at least one mandrel rail is attached to the first brace and third brace.

3. The device according to claim 1, wherein the mandrel comprises a first base having a dimension D1;

a second base having a dimension D2, wherein D2 is greater than D1;

a mandrel surface circumferentially and longitudinally disposed about the first base and the second base;

a plurality of charging pins positioned along the mandrel surface from the first base to the second base; and a plurality of suction holes positioned along the mandrel surface;

wherein at least the surface of the mandrel comprises a non-conducting material that is not deformable or hygroscopic at ambient conditions.

4. The device according to claim 3, wherein the non-conducting material comprises one or more materials selected from the group consisting of fluoropolymers, homopolymers and copolymers of olefins, homopolymers and copolymers of vinyl aromatic monomers, polyesters, polyamides, polyesteramides, homopolymers and copolymers of vinyl chloride, polycarbonates, polysulfones, ceramics, wood, glass, elastomeric polymers, combinations thereof and metals coated with one or more of the materials listed herein.

5. The device according to claim 1, wherein the mandrel is free floating when positioned in a female portion.

6. The device according to claim 1 further comprising one or more magazines, adapted to hold a plurality of label sheets, attached to the frame and adapted to move between a loading position; and a feeding position; and one or more suction plates attached to an arm, the arms being attached to the frame, the arms being adapted to move between a pick up position, where the suction plates are in close proximity to a top label in the magazines, and a feeding position, where the suction plates are in close proximity to the mandrel when the mandrel car is in the readying position.

7. The device according to claim 1, wherein each male portion is horizontally opposed to a female portion mold of a two-part mold.

8. The device according to claim 1, wherein the female portion comprises stainless steel and the male portion comprises bronze.

9. The device according to claim 1, wherein the pre-expanded resin beads comprise one or more materials selected from the group consisting of homopolymers of vinyl aromatic monomers; an interpolymer of a polyolefin and in situ polymerized vinyl aromatic monomers, copolymers of at least one vinyl aromatic monomer with one or more of divinylbenzene, conjugated dienes, alkyl (meth)acrylates, (meth)acrylonitrile, olefins, and/or maleic anhydride; polyolefins; polycarbonates; polyesters; polyamides; natural rubbers; synthetic rubbers; and combinations thereof;

wherein the pre-expanded resin beads have a density of from at least 0.5 to less than 40 lb./ft$^3$.

10. The device according to claim 9, wherein the pre-expanded resin beads have a number average particle size of from 100 to 600 microns.

11. The device according to claim 9, wherein the pre-expanded resin beads comprise polystyrene impregnated with a blowing agent that has been suspended in an aqueous system comprising one or more of dispersing aids, nonionic surfactants and waxes;

wherein the dispersing aids are present at a level of up to about 2 parts by weight per 100 parts by weight of resin beads and are selected from the group consisting of tricalcium phosphate, zinc oxide, bentonite, talc, kaolin, magnesium carbonate, aluminum oxide, polyvinyl alcohol, alkyl aryl sulfonates, hydroxyethyl cellulose, polyacrylic acid, methyl cellulose, polyvinyl pyrrolidone, sodium and combinations thereof;

wherein the non-ionic surfactants are present at a level of up to about 2 parts by weight per 100 parts by weight of resin beads;

wherein the waxes are present at a level of up to about 2 parts by weight per 100 parts by weight of resin beads and are selected from the group consisting of $C_{10}$ to $C_{32}$ linear, branched or cyclic alkyl, alkenyl, aryl, alkaryl, or aralkyl alcohols;

$C_{10}$ to $C_{32}$ linear, branched or cyclic alkyl, alkenyl, aryl, alkaryl, or aralkyl carboxylic acids, their corresponding ammonium or metal salts, or $C_1$ to $C_{32}$ linear, branched or cyclic alkyl, alkenyl, aryl, alkaryl, or aralkyl esters thereof;

$C_{10}$ to $C_{32}$ linear, branched or cyclic alkyl, alkenyl, aryl, alkaryl, or aralkyl hydrocarbons;

polyethylene;

polypropylene;

polyester;

polyether;

and combinations thereof.

* * * * *